(12) United States Patent
Akl et al.

(10) Patent No.: US 12,256,375 B2
(45) Date of Patent: Mar. 18, 2025

(54) WIRELESS TRAFFIC PREDICTION

(71) Applicant: QUALCOMM Incorporated, San Diego, CA (US)

(72) Inventors: Naeem Akl, Somerville, NJ (US); Navid Abedini, Basking Ridge, NJ (US); Karl Georg Hampel, Jersey City, NJ (US); Jianghong Luo, Skillman, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 455 days.

(21) Appl. No.: 17/653,864

(22) Filed: Mar. 7, 2022

(65) Prior Publication Data
US 2023/0284204 A1   Sep. 7, 2023

(51) Int. Cl.
*H04W 72/12*   (2023.01)
*H04W 72/0446*   (2023.01)
(Continued)

(52) U.S. Cl.
CPC ... *H04W 72/1263* (2013.01); *H04W 72/0446* (2013.01); *H04W 72/21* (2023.01); *H04W 72/23* (2023.01)

(58) Field of Classification Search
CPC ......... H04W 72/1263; H04W 72/0446; H04W 72/21; H04W 72/23
See application file for complete search history.

(56) References Cited

U.S. PATENT DOCUMENTS

| 2013/0182623 A1* | 7/2013 | Fan | H04W 72/21 370/329 |
| 2013/0242726 A1* | 9/2013 | Zhu | H04L 1/1635 370/329 |

(Continued)

FOREIGN PATENT DOCUMENTS

WO   WO-2021255107 A1 *  12/2021

OTHER PUBLICATIONS

Source: NEC; Title: "Clarifications on UE requested bearer resource allocation and UE requested bearer resource release procedures" Date: Apr. 7-Apr. 11, 2008. pp. 1-6. (Year: 2008).*

(Continued)

*Primary Examiner* — Fahmida S Chowdhury
(74) *Attorney, Agent, or Firm* — ArentFox Schiff LLP

(57) ABSTRACT

In certain aspects, the disclosure is directed to a user equipment (UE) configured for wireless communications with a network node. The UE may include a memory comprising instructions, and one or more processors configured to execute the instructions. In some examples, the UE may transmit, to a network node, an indication of an expected communication. In some examples, the UE may receive, from the network node, updated scheduling in response to the indication of the expected communication. For example, the UE may predict a future sidelink/uplink communication based on whether the UE expects data for a future uplink transmission. If the UE expects that it will have data for a future uplink transmission, the UE may notify the network node so that the network node can enter into a low power state until the future transmission, then provide the UE with a sidelink/uplink grant for the future uplink transmission.

28 Claims, 17 Drawing Sheets

1000

| UE Assistance Information 1002 | Granularity 1004 | Signaling 1006 |
|---|---|---|
| 1008 — Upcoming traffic expected after a configured/indicated time | All scheduling | SR requesting deferred UL grant |
| | LCG | BSR with expected UL traffic |
| 1010 — No traffic for a configured/indicated time | All scheduling | UCI: No SR for configured/indicated time |
| | | MAC CE: No SR for configured/indicated time |
| | LCG | BSR with no expected UL traffic on LCG |
| 1012 — RRC Release | All scheduling | RRC/UCI/MAC-CE: Request RRC release |

(51) Int. Cl.
*H04W 72/1263* (2023.01)
*H04W 72/21* (2023.01)
*H04W 72/23* (2023.01)

(56) References Cited

U.S. PATENT DOCUMENTS

| | | | |
|---|---|---|---|
| 2015/0117342 A1* | 4/2015 | Loehr | H04W 72/23 |
| | | | 370/329 |
| 2015/0289287 A1* | 10/2015 | Larsson | H04W 72/52 |
| | | | 370/230 |
| 2015/0305056 A1* | 10/2015 | Vangala | H04W 76/27 |
| | | | 455/450 |
| 2018/0279363 A1* | 9/2018 | Su | H04J 11/005 |
| 2019/0045524 A1* | 2/2019 | Pettersson | H04W 28/0278 |
| 2019/0166576 A1* | 5/2019 | Kim | H04W 52/0206 |
| 2019/0364449 A1* | 11/2019 | Yang | H04W 72/04 |
| 2020/0413476 A1* | 12/2020 | He | H04W 76/30 |
| 2021/0218458 A1* | 7/2021 | Kung | H04W 80/02 |
| 2022/0109489 A1* | 4/2022 | Zhu | H04L 1/1614 |

OTHER PUBLICATIONS

International Search Report and Written Opinion—PCT/US2023/062610—ISA/EPO—Jun. 12, 2023 (2201281WO).
NEC: "CR 24.301: Clarifications on UE Requested Bearer Resource Allocation and UE Requested Bearer Resource Release Procedures", 3GPP TSG CT WG1 Meeting #52, C1-080825, 3rd Generation Partnership Project, Mobile Competence Centre, 650, Route Des Lucioles, F-06921 Sophia-Antipolis Cedex, France, vol. CT WG1, No. Jeju Island, Mar. 31, 2008, Mar. 31, 2008, 6 Pages, XP050028151, Chapters 6.5.4.2 and 6.5.4.3.

* cited by examiner

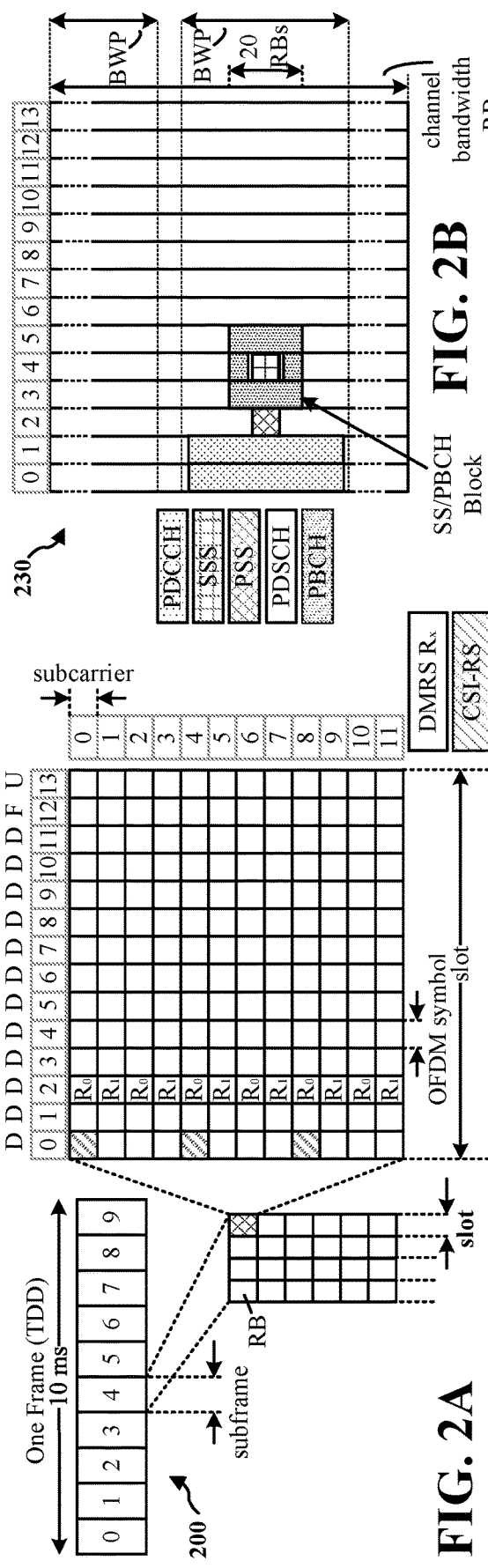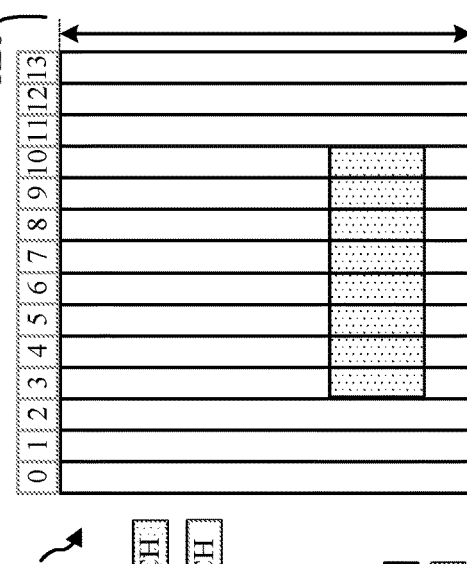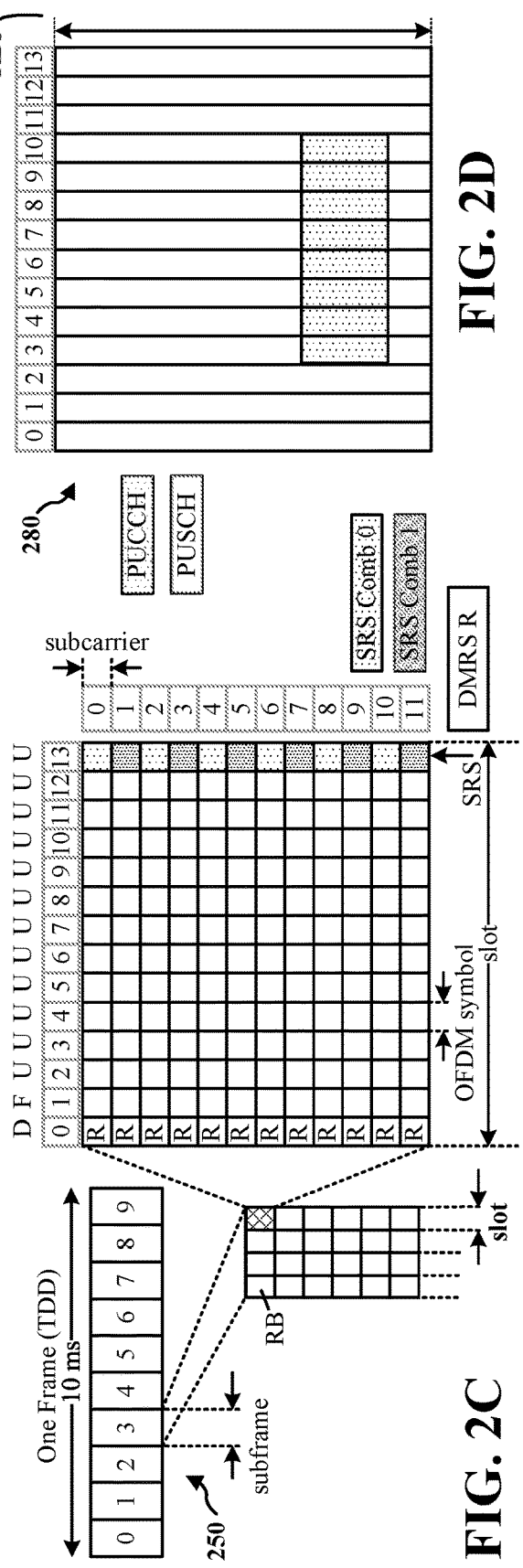
FIG. 2A  FIG. 2B  FIG. 2C  FIG. 2D

| UE Assistance Information 1002 | Granularity 1004 | Signaling 1006 |
|---|---|---|
| Upcoming traffic expected after a configured/indicated time | All scheduling | SR requesting deferred UL grant |
| | LCG | BSR with expected UL traffic |
| No traffic for a configured/indicated time | All scheduling | UCI: No SR for configured/indicated time |
| | | MAC CE: No SR for configured/indicated time |
| | LCG | BSR with no expected UL traffic on LCG |
| RRC Release | All scheduling | RRC/UCI/MAC-CE: Request RRC release |

FIG. 10

WIRELESS TRAFFIC PREDICTION

BACKGROUND

Technical Field

The present disclosure generally relates to communication systems, and more particularly, to techniques for predicting wireless communications and updating scheduling based on the predictions.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Certain aspects are directed to an apparatus for wireless communications, comprising a memory comprising instructions; and one or more processors configured to execute the instructions. In some examples, the apparatus is configured to output, for transmission to a network node, an indication of an expected communication. In some examples, the apparatus is configured to obtain, from the network node, updated scheduling in response to the indication of the expected communication.

Certain aspects are directed to an apparatus for wireless communications, comprising: a memory comprising instructions; and one or more processors configured to execute the instructions. In some examples, the apparatus is configured to obtain, from a user equipment (UE), an indication of an expected communication. In some examples, the apparatus is configured to output, for transmission to the UE, updated scheduling in response to the indication of the expected communication.

Certain aspects are directed to a method for wireless communications at an apparatus. In some examples, the method includes outputting, for transmission to a network node, an indication of an expected communication. In some examples, the method includes obtaining, from the network node, updated scheduling in response to the indication of the expected communication.

Certain aspects are directed to a method for wireless communications at an apparatus. In some examples, the method includes obtaining, from a user equipment (UE), an indication of an expected communication. In some examples, the method includes outputting, for transmission to the UE, updated scheduling in response to the indication of the expected communication.

Certain aspects are directed to an apparatus for wireless communications. In some examples, the apparatus includes means for outputting, for transmission to a network node, an indication of an expected communication. In some examples, the apparatus includes means for obtaining, from the network node, updated scheduling in response to the indication of the expected communication.

Certain aspects are directed to an apparatus for wireless communications. In some examples, the apparatus includes means for obtaining, from a user equipment (UE), an indication of an expected communication. In some examples, the apparatus includes means for outputting, for transmission to the UE, updated scheduling in response to the indication of the expected communication.

Certain aspects are directed to a non-transitory computer-readable medium having instructions stored thereon that, when executed by an apparatus, cause the apparatus to perform operations. In some examples, the operations include outputting, for transmission to a network node, an indication of an expected communication. In some examples, operations include obtaining, from the network node, updated scheduling in response to the indication of the expected communication Certain aspects are directed to a non-transitory computer-readable medium having instructions stored thereon that, when executed by an apparatus, cause the apparatus to perform operations. In some examples, the operations include obtaining, from a user equipment (UE), an indication of an expected communication. In some examples, the operations include outputting, for transmission to the UE, updated scheduling in response to the indication of the expected communication To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIG. 10 is a table illustrating an example implementation of UE assistance information.

DETAILED DESCRIPTION

Figure 1:
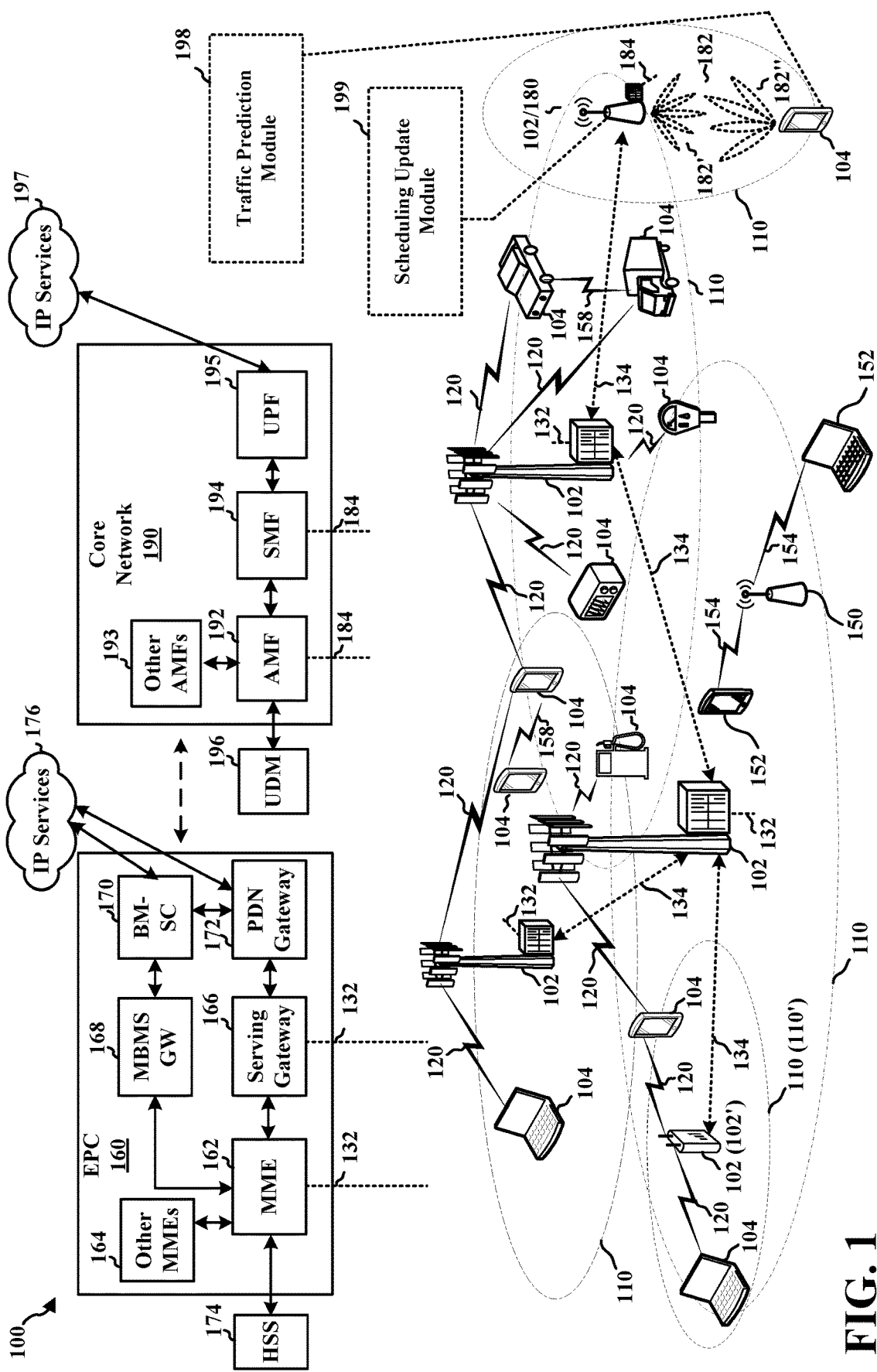
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In a first example, when a radio resource control (RRC) connection is established between a user equipment (UE) and a network node, the network node may configure the UE with a defined period of time called a data inactivity timer (e.g., DataInactivityTimer information element (IE)) associated with the RRC connection. If the network node determines that there is no UE activity (e.g., the UE does not transmit and/or receive) during the defined period of time, then the network node may initiate procedures to put the UE in idle mode. However, that the data inactivity timer is an optional configuration. That is, the network node may not always configure the UE with the data inactivity timer. In such an example, the network node does not know when the UE let its RRC connection go idle. As such, the network node may continue to reserve communication resources (e.g., time and/or frequency resources) and processing resources (e.g., scheduling resources) for the UE even after the UE is no longer active.

In a second example, a distributed unit (DU) (e.g., part of an aggregated or disaggregated base station) may perform wireless communication tasks for a UE, such as scheduling and physically communication with the UE, and a central unit (CU) (e.g., also part of an aggregated or disaggregated base station) may be configured to interact with a core network and terminate an RRC connection between the network node and the UE. In some examples, the CU may configure the DU to notify the CU whenever the DU determines that the UE is inactive or a particular data radio bearer (DRB) of the UE is inactive. It should be noted that the DU may not be relying on a timer (e.g., an inactivity timer) to determine when the UE or a particular DRB is inactive. Thus, as discussed above, the network node (e.g., the DU) does not know when the UE goes idle or when the UE will let its DRB go idle. As such, the network node may continue to reserve communication resources (e.g., time and/or frequency resources) and processing resources (e.g., scheduling resources) for a DRB for the UE even after the UE stops using the DRB.

In a third example, a central unit-control plane (CU-CP) may configure a central unit-user plane (CU-UP) to notify the CU-CP when the CU-UP determines that a radio bearer is inactive. Thus, in such an example, the CU-UP may monitor for inactivity of a radio bearer of a UE, and transmit a bearer context inactivity notification to the CU-CP if it determines inactivity. In certain aspects, the bearer context inactivity notification may provide information of varying levels of granularity to the CU-CP. For example, at the highest level of granularity, the bearer context inactivity notification may indicate that the UE (and all associated DRBs and protocol data units (PDUs)) is inactive. At another level of granularity, the bearer context inactivity notification may indicate that a particular DRB associated with the UE is inactive (e.g., while another DRB associated with the UE remains active). At another level of granularity, the bearer context inactivity notification may indicate that a particular PDU session associated with the UE is inactive (e.g., while other PDU sessions remain active). In some examples, the CU-UP may determine that a UE, a DRB, and/or a PDU session is inactive if there have not been any associated communications within a timer period. For example, the time period may be an inactivity timer having a duration of up to 2 hours (e.g., 7200 seconds), based on configuration of the CU-UP.

The three examples above are illustrative of different aspects of the network node that "guess" at when the UE, or part of a UEs communication is inactive. Because of the relatively large windows of time provided by the timers, or because of the lack of any timer, the network node may be reserving resources that will not be used by the UE, and thereby depriving other devices of the use of those resources.

In a fourth example, when a UE has data to send to a network node, the UE may transmit a scheduling request (SR) to the network node requesting an uplink grant. In response to the SR, the network node may reserve and schedule resources for the uplink transmission and transmit an indication of the scheduling via an uplink grant to the UE. Upon receiving the uplink grant, the UE may send an uplink transmission to the network node. However, the SR may not provide the network node with an indication of an amount of resources needed for the uplink transmission. As such, the uplink grant may not provide the UE with enough resources to include all the UE's data in the uplink transmission. Accordingly, the UE may initially transmit a portion of the uplink data using the granted uplink resources and include a buffer status report (BSR) (e.g., padding BSR) with the transmitted portion of uplink data to notify the network node that the UE still has data for uplink transmission.

Note, that in the fourth example, the UE may only send the SR when it has data for uplink communications, but when and how often the UE has data for uplink may be known by the UE but is not known to the network node. As a result, the network node may be required to monitor for SRs from the UE continuously and blindly. As such, the network node uses a relatively large amount of energy even when it is not scheduling the UE. And if the network node is serving multiple UEs, even more energy is used.

Accordingly, it would be beneficial for the UE to provide assistance information to the network node to notify the network node of whether the UE is idle/inactive and for how long, when the network node can expect the UE to provide an SR or a BSR, and/or when the network node is expected to provide uplink resources to the UE. By providing the network node with assistance information, network node energy usage relating to waiting to determine inactivity of the UE and monitoring for SRs from the UE can be reduced. As such, the assistance information may help the network node perform procedures such as SR/BSR handling, RRC connection handling, resource reservation for UE radio bearers, etc. more efficiently. It should be noted that the examples described above may be applied to peer-to-peer (P2P) or device-to-device (D2D) communications with equal thrust (e.g., sidelink communications) as described in more detail below.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells. Throughout the disclosure, a "network node" may be used to refer to a base station. A network node or base station can be implemented as an aggregated base station, as a disaggregated base station, an integrated access and backhaul (IAB) node, a relay node, a sidelink node, etc. A network node can be implemented in an aggregated or monolithic base station architecture (e.g., FIG. 4), or alternatively, in a disaggregated base station architecture (e.g., FIGS. 5 and 6), and may include one or more of a central unit (CU), a distributed unit (DU), a radio unit (RU), a near-real time (near-RT) radio access network (RAN) intelligent controller (RIC), or a non-real time (non-RT) RIC.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using peer-to-peer (P2P) or device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS bearer services within a public land mobile network (PLMN), and may be used to schedule MBMS transmissions. The MBMS Gateway 168 may be used to distribute MBMS traffic to the base stations 102 belonging to a multicast broadcast single frequency network (MBSFN) area broadcasting a particular service, and may be responsible for session management (start/stop) and for collecting eMBMS related charging information.

The core network 190 may include an access and mobility management function (AMF) 192, other AMFs 193, a session management function (SMF) 194, and a user plane function (UPF) 195. The AMF 192 may be in communication with a unified data management (UDM) 196. The AMF 192 is the control node that processes the signaling between the UEs 104 and the core network 190. Generally, the AMF 192 provides quality of service (QoS) flow and session management. All user IP packets are transferred through the UPF 195. The UPF 195 provides UE IP address allocation as well as other functions. The UPF 195 is connected to the IP Services 197. The IP services 197 may include the Internet, an intranet, an IMS, a packet switch (PS) streaming service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured with a traffic prediction module 198. The traffic prediction module 198 may be configured to output, for transmission to a network node, an indication of an expected communication; and obtain, from the network node, updated scheduling in response to the indication of the expected communication.

Referring again to FIG. 1, in certain aspects, the base station 102/180 may be configured with a scheduling update module 199. The scheduling update module 199 may be configured to obtain, from a user equipment (UE), an indication of an expected communication; and output, for transmission to the UE, updated scheduling in response to the indication of the expected communication.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Additionally or alternatively, the concepts and various aspects described herein may be of particular applicability to one or more specific areas, such as for use in Open-Radio Access Network (O-RAN) architectures with RAN intelligent controllers (RICs) as described in greater detail below.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
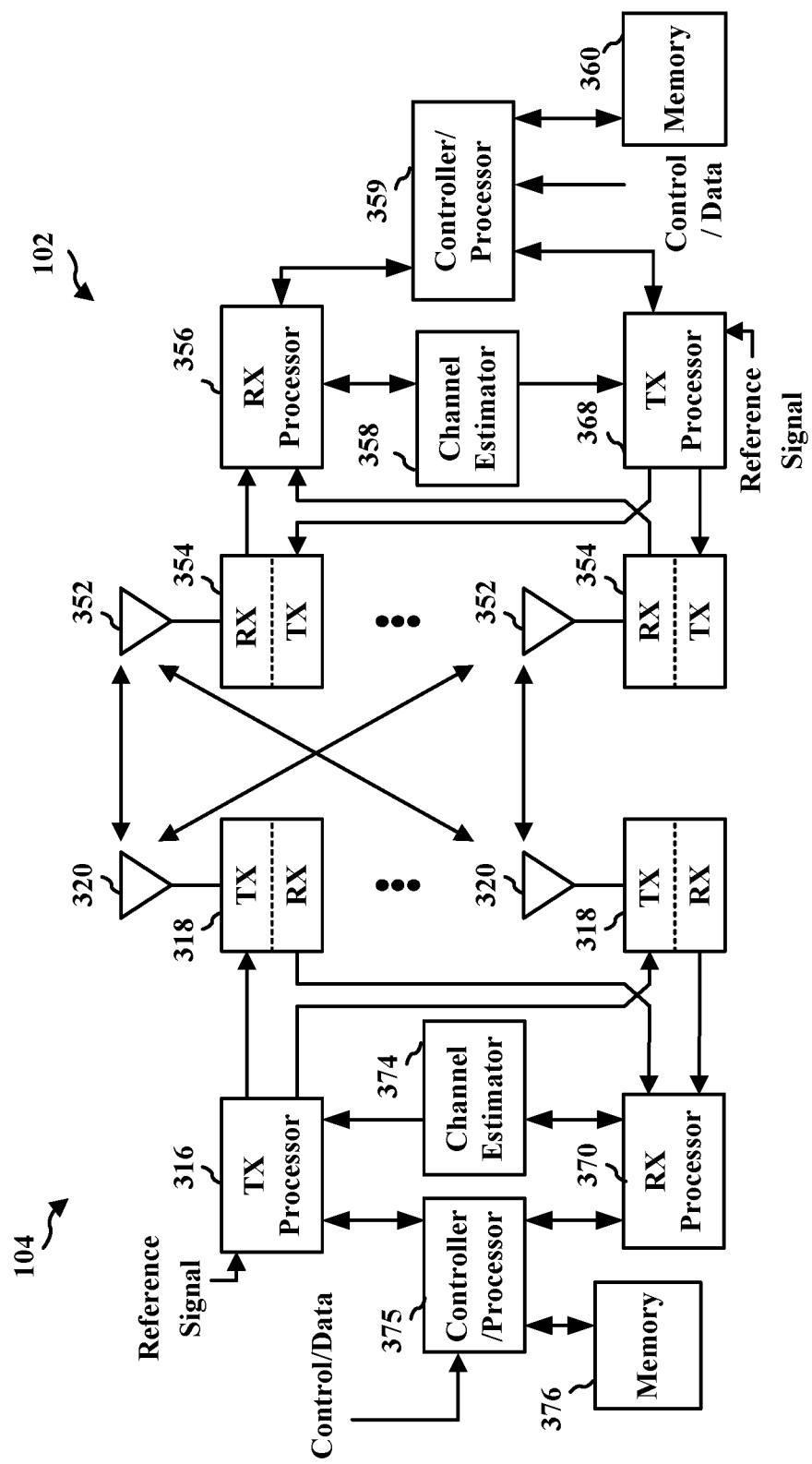
FIG. 3 is a diagram illustrating an example of a base station and user equipment (UE) in an access network.

FIG. 3 is a block diagram of a base station 102 in communication with a UE 104 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 102. These soft decisions may be based on channel estimates computed by the channel estimator 358. The soft decisions are then decoded and deinterleaved to recover the data and control signals that were originally transmitted by the base station 102 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 102, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the traffic prediction module 198 of FIG. 1.

At least one of the TX processor 316, the RX processor 370, and the controller/processor 375 may be configured to perform aspects in connection with the scheduling update module 199 of FIG. 1.

Figure 4:
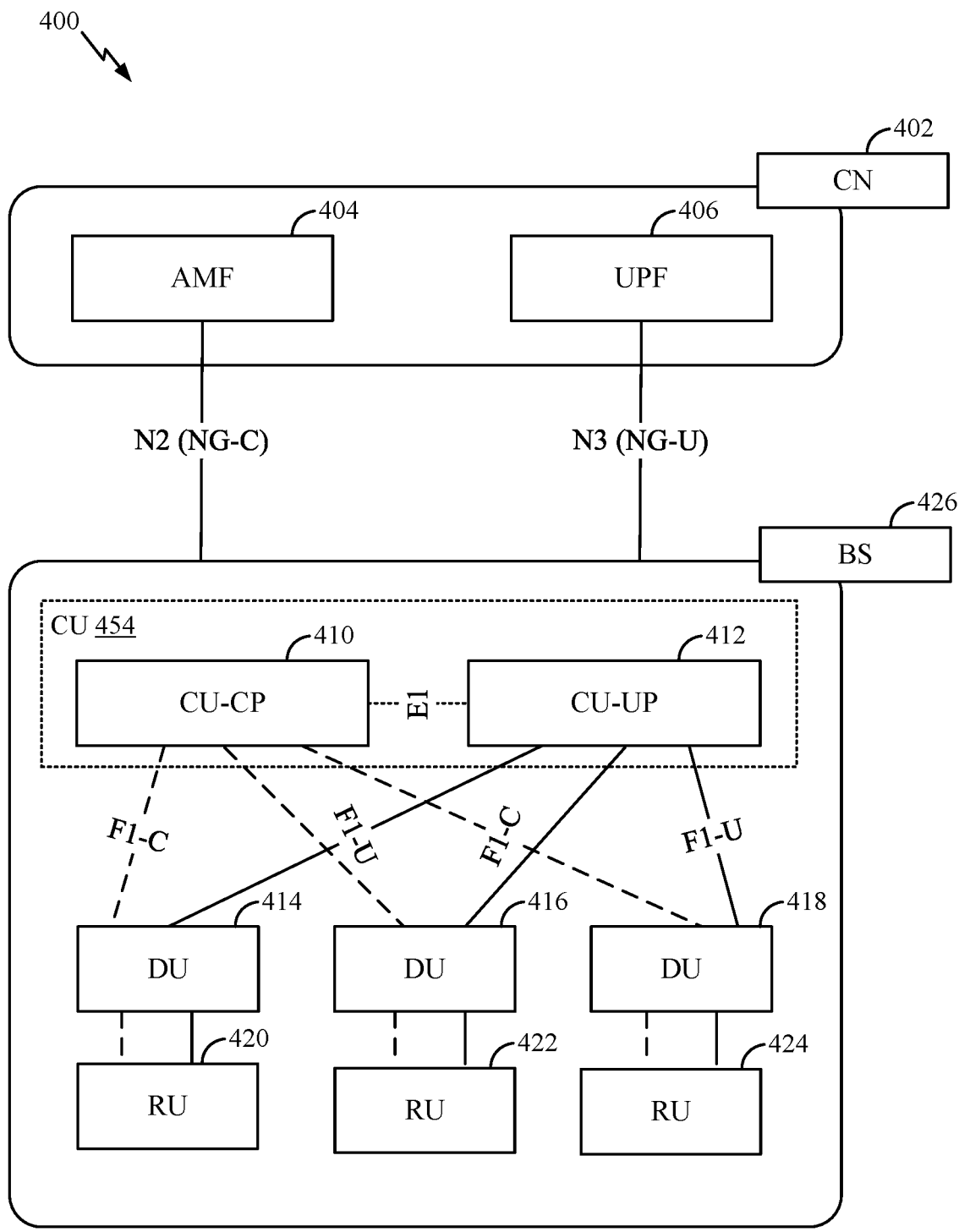
FIG. 4 illustrates an example monolithic architecture of a distributed radio access network (RAN).

FIG. 4 illustrates an example monolithic (e.g., disaggregated) architecture of a distributed RAN 400, which may be implemented in the wireless communications system and an access network 100 illustrated in FIG. 1. As illustrated, the distributed RAN 400 includes core network (CN) 402 and a base station 426.

The CN 402 may host core network functions. CN 402 may be centrally deployed. CN 402 functionality may be offloaded (e.g., to advanced wireless services (AWS)), in an effort to handle peak capacity. The CN 402 may include an AMF 404 and a UPF 406. The AMF 404 and UPF 406 may perform one or more of the core network functions.

The base station 426 may communicate with the CN 402 (e.g., via a backhaul interface). The base station 426 may communicate with the AMF 404 via an N2 (e.g., NG-C) interface. The base station 426 may communicate with the UPF 406 via an N3 (e.g., NG-U) interface. The base station 426 may include a central unit-control plane (CU-CP) 410, one or more central unit-user planes (CU-UPs) 412, one or more distributed units (DUs) 414-418, and one or more radio units (RUs) 420-424.

The CU-CP 410 may be connected to one or more of the DUs 414-418. The CU-CP 410 and DUs 414-418 may be connected via a F1-C interface. As shown in FIG. 4, the CU-CP 410 may be connected to multiple DUs, but the DUs may be connected to only one CU-CP. Although FIG. 4 only illustrates one CU-UP 412, the base station 426 may include multiple CU-UPs. The CU-CP 410 selects the appropriate CU-UP(s) for requested services (e.g., for a UE). The CU-UP(s) 412 may be connected to the CU-CP 410. For example, the CU-UP(s) 412 and the CU-CP 410 may be connected via an E1 interface. The CU-UP(s) 412 may be connected to one or more of the DUs 414-418. The CU-UP(s) 412 and DUs 414-418 may be connected via a F1-U interface. As shown in FIG. 4, the CU-CP 410 may be connected to multiple CU-UPs, but the CU-UPs may be connected to only one CU-CP 410.

A DU, such as DUs 414, 416, and/or 418, may host one or more TRP(s) (transmit/receive points, which may include an edge node (EN), an edge unit (EU), a radio head (RH), a smart radio head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 414-416 may be connected with one of RUs 420/422/424.

The CU-CP 410 may be connected to multiple DU(s) that are connected to (e.g., under control of) the same CU-UP 412. Connectivity between a CU-UP 412 and a DU may be established by the CU-CP 410. For example, the connectivity between the CU-UP 412 and a DU may be established using bearer context management functions. Data forwarding between CU-UP(s) 412 may be via a Xn-U interface.

The distributed RAN 400 may support fronthauling solutions across different deployment types. For example, the RAN 200 architecture may be based on transmit network capabilities (e.g., bandwidth, latency, and/or jitter). The distributed RAN 200 may share features and/or components with LTE. For example, the base station 426 may support dual connectivity with NR and may share a common fronthaul for LTE and NR. The distributed RAN 400 may enable cooperation between and among DUs 414-418, for example, via the CU-CP 412. An inter-DU interface may not be used. Logical functions may be dynamically distributed in the distributed RAN 400.

Figure 5:
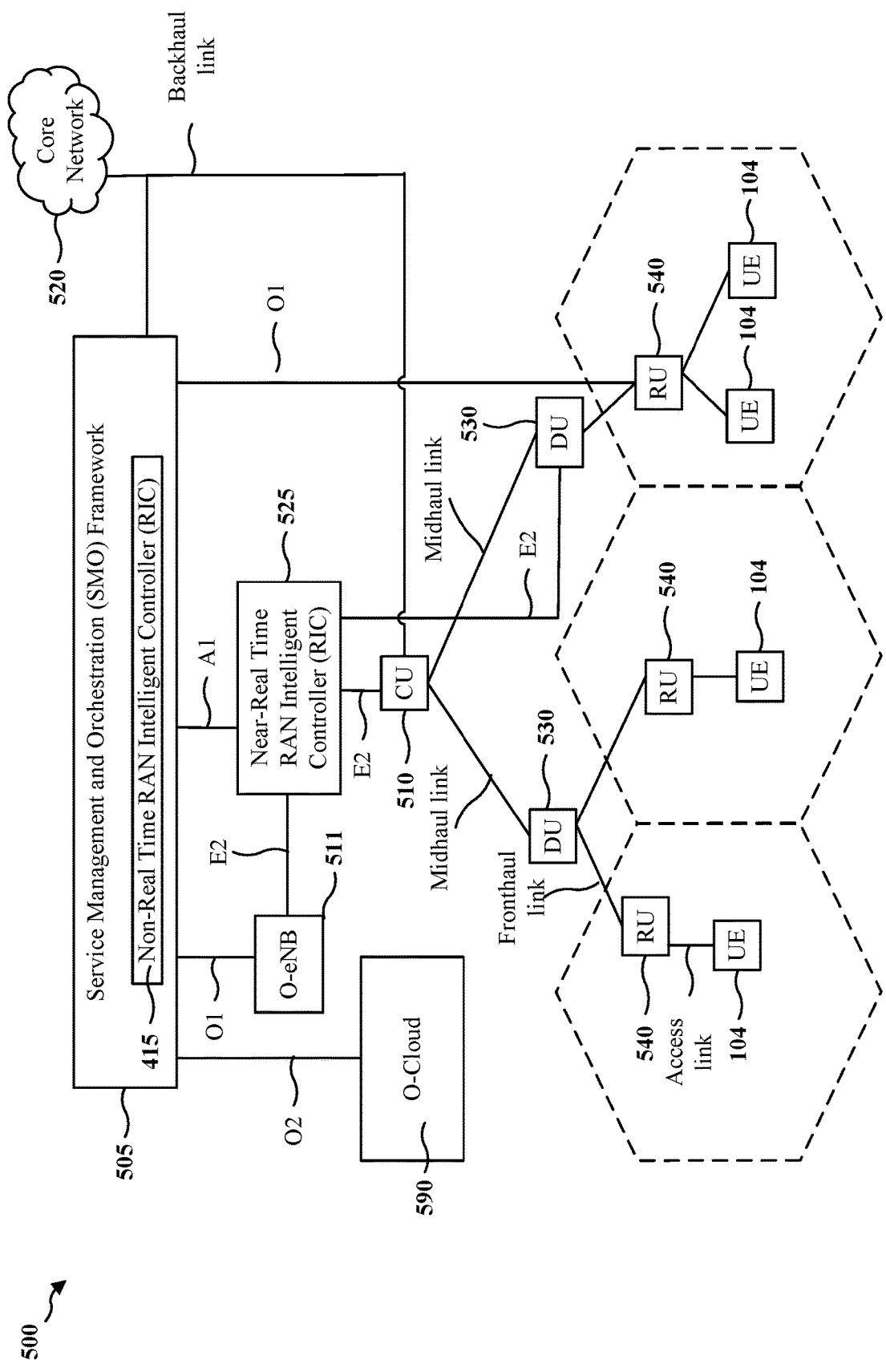
FIG. 5 shows a diagram illustrating an example disaggregated base station architecture

FIG. 5 shows a diagram illustrating an example disaggregated base station 500 architecture. The disaggregated base station 500 architecture may include one or more CUs 510 that can communicate directly with a core network 520 via a backhaul link, or indirectly with the core network 520 through one or more disaggregated base station units (such as a near real-time (RT) RIC 525 via an E2 link, or a non-RT RIC 515 associated with a service management and orchestration (SMO) Framework 505, or both). A CU 510 may communicate with one or more DUs 530 via respective midhaul links, such as an F1 interface. The DUs 530 may communicate with one or more RUs 540 via respective fronthaul links. The RUs 540 may communicate with respective UEs 104 via one or more radio frequency (RF) access links. In some implementations, the UE 104 may be simultaneously served by multiple RUs 540.

Each of the units, i.e., the CUs 510, the DUs 530, the RUs 540, as well as the near-RT RICs 525, the non-RT RICs 515 and the SMO framework 505, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 510 may host higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 510. The CU 510 may be configured to handle user plane functionality (i.e., central unit—user plane (CU-UP)), control plane functionality (i.e., central unit—control plane (CU-CP)), or a combination thereof. In some implementations, the CU 510 can be logically split into one or more CU-UP units and one or more CU-CP units. The CU-UP unit can communicate bidirectionally with the CU-CP unit via an interface, such as the E1 interface when implemented in an O-RAN configuration. The CU 510 can be implemented to communicate with the DU 530, as necessary, for network control and signaling.

The DU 530 may correspond to a logical unit that includes one or more base station functions to control the operation of one or more RUs 540. In some aspects, the DU 530 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 530 may further host one or more low PHY layers. Each layer (or module) can be implemented with an interface configured to communicate signals with other layers (and modules) hosted by the DU 530, or with the control functions hosted by the CU 510.

Lower-layer functionality can be implemented by one or more RUs 540. In some deployments, an RU 540, controlled by a DU 530, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 540 can be implemented to handle over the air (OTA) communication with one or more UEs 120. In some implementations, real-time and non-real-time aspects of control and user plane communication with the RU(s) 540 can be controlled by the corresponding DU 530. In some scenarios, this configuration can enable the DU(s) 530 and the CU 510 to be implemented in a cloud-based RAN architecture, such as a virtual RAN (vRAN) architecture.

The SMO Framework 505 may be configured to support RAN deployment and provisioning of non-virtualized and virtualized network elements. For non-virtualized network elements, the SMO framework 505 may be configured to support the deployment of dedicated physical resources for RAN coverage requirements, which may be managed via an operations and maintenance interface (such as an O1 interface). For virtualized network elements, the SMO framework 505 may be configured to interact with a cloud computing platform (such as an open cloud (O-cloud) 590) to perform network element life cycle management (such as to instantiate virtualized network elements) via a cloud computing platform interface (such as an O2 interface). Such virtualized network elements can include, but are not limited to, CUs 510, DUs 530, RUs 540 and near-RT RICs 525. In some implementations, the SMO framework 505 can communicate with a hardware aspect of a 4G RAN, such as an open eNB (O-eNB) 511, via an O1 interface. Additionally, in some implementations, the SMO Framework 505 can communicate directly with one or more RUs 540 via an O1 interface. The SMO framework 505 also may include the non-RT RIC 515 configured to support functionality of the SMO Framework 505.

The non-RT RIC 515 may be configured to include a logical function that enables non-real-time control and optimization of RAN elements and resources, artificial intelligence/machine learning (AI/ML) workflows including model training and updates, or policy-based guidance of applications/features in the near-RT RIC 525. The non-RT RIC 515 may be coupled to or communicate with (such as via an A1 interface) the near-RT RIC 525. The near-RT RIC 525 may be configured to include a logical function that enables near-real-time control and optimization of RAN elements and resources via data collection and actions over an interface (such as via an E2 interface) connecting one or more CUs 510, one or more DUs 530, or both, as well as an O-eNB, with the near-RT RIC 525.

In some implementations, to generate AI/ML models to be deployed in the near-RT RIC 525, the non-RT RIC 515 may receive parameters or external enrichment information from external servers. Such information may be utilized by the near-RT RIC 525 and may be received at the SMO Framework 505 or the non-RT RIC 515 from non-network data sources or from network functions. In some examples, the non-RT RIC 515 or the near-RT RIC 525 may be configured to tune RAN behavior or performance. For example, the non-RT RIC 515 may monitor long-term trends and patterns for performance and employ AI/ML models to perform corrective actions through the SMO Framework 505 (such as reconfiguration via 01) or via creation of RAN management policies (such as A1 policies).

Figure 6:
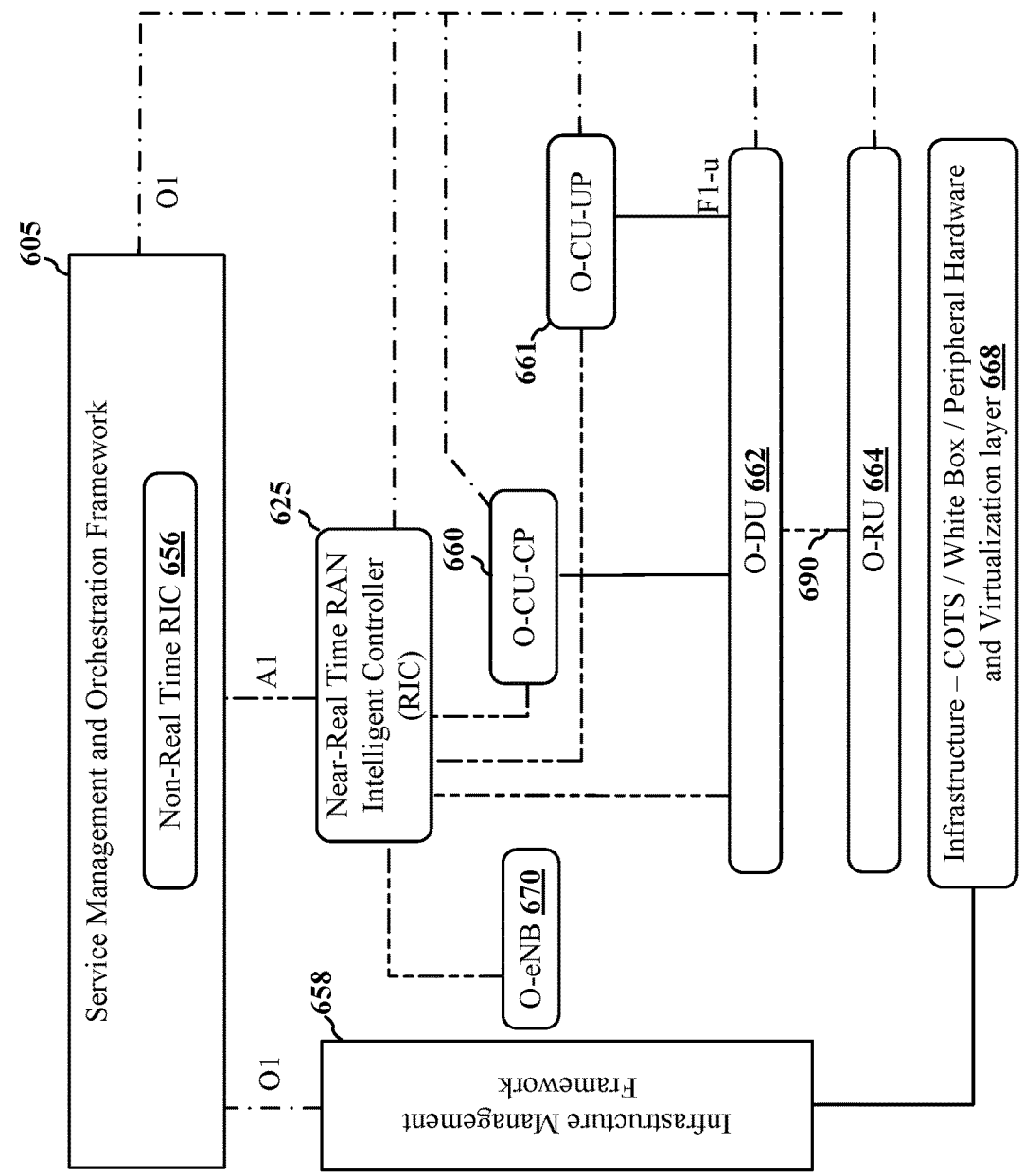
FIG. 6 is a conceptual diagram of an example open radio access network (O-RAN) architecture.

FIG. 6 is a conceptual diagram of an O-RAN architecture 600. O-RAN 600 beneficially provides an open architecture to which different network operators can link to provide a systematic, interoperable network. The conventional O-RAN architecture may be configured to include certain key functional elements. These include an SMO framework 605 (which may include a non-RT RIC 656), as also seen in FIG. 5), an O-DU software component 662, a multi-RAT CU protocol stack (which may in turn include an O-RAN CU-CP (O-CU-CP) 660 and an O-RAN CU-UP (O-CU-UP) 661), a near-RT RIC 625, an O-RAN eNB 670, an Infrastructure Management Framework 658, and an Infrastructure—Commercial Off The Shelf (COTS)/White Box/Peripheral Hardware and Virtualization Layer 668. Referring back to FIG. 5, SMO framework 605 may correspond to SMO framework 505, non-RT RIC 656 may correspond to non-RT RIC 515, O-DU software component 662 may correspond to DU 530, O-CU-CP 660 and O-CU-UP 661 may correspond to functionality of CU 510, near-RT RIC 625 may correspond to near-RT RIC 625, O-RAN eNB 670 may correspond to O-eNB 511, and infrastructure management framework 658 may be included in O-Cloud 590.

For simplicity and to avoid unduly obscuring the present disclosure, various inputs and outputs have been omitted from the architecture of FIG. 6, including signals to and from O-CU-CP 660 and O-CU-UP 661. The non-RT component 656 is capable of processing data offline or processing data quickly but typically greater than a threshold, such as one millisecond. Accordingly, the non-RT component 656 can process tasks for which there is not an immediate need for a response, but that may have a temporal allowance which makes the non-RT component 656 a natural choice to process the data.

One or more of these components may also interact with the radio unit (RU) hardware 664. For example, the O-DU component 662 may communicate with the O-RU component 664 via the open fronthaul interface 690. Components such as non-RT RIC 656 and near-RT RIC 625 may interact with the O-RU hardware 664 to assist O-RU 664 in running more efficiently and to optimize the O-RU 664 in real time as part of the RAN cluster to deliver a better network experience to end users. Both the non-RT RIC 656 and the near-RT RIC 625 may be used in connection with the service discovery and service session procedures due to their ability to process priority data at high speeds or in the background.

As discussed with reference to FIGS. 5 and 6, the non-RT RIC 515, 656 includes several functions potentially relevant to the aspects herein. The non-RT RIC 515, 656 includes functions such as configuration management, device management, fault management, performance management, and lifecycle management for all network elements. The non-RT RIC 515, 656 can use data analytics, artificial intelligence (AI) and ML training and inference to determine the RAN optimization actions, for which it can leverage the service management and orchestration (SMO) framework 505, 605, including data collection and provisioning services of the O-RAN nodes.

The near-RT RIC 525, 625 may utilize embedded processors or intelligent code for per-UE controlled load balancing, RB management, interference detection and mitigation, and other functions that are desirable to process in a prioritized manner in order to successfully use ML training/inference models. The near-RT RIC 525, 625 may provide quality-of-service (QoS) management, connectivity management and seamless handover control. Near-RT RIC 525, 625 may also leverage the near real-time state of the underlying network and may feed RAN data to train the AI/ML models. The modified models can then be provided to the near-RT RIC to facilitate high quality radio resource management for the subscriber.

In some configurations, the near-RT RIC 525, 625 performs similar beam prediction management functions as the non-RT RIC 515, 656 for data that does not require near-RT priority. More often, due to the nature of its temporal priority, near-RT RIC 525, 625 executes the different ML model and beam interference predictions for the different actors (such as, for example, the O-CU-CP 660, O-CU-UP 661, O-DU 662 and O-RU 664). The latter four components are functions with the base station, which four elements show the disaggregation of the elements in this architecture. Further, in this configuration, the near-RT RIC 525, 625 is co-located with the gNB because it supports the loop delay in the inference operation, which is faster than 1 second.

The non-RT RIC 515, 656, as noted, may support inference operations with a delay slower than 1 ms, and can be located near the gNB, such as being nearby in a cloud or edge server. In short, the near-RT RIC 525, 625 or non-RT RIC may act as an inference host in the beam prediction architecture, and in the disaggregated base station, the four actors (660, 661, 662 and 664) are portions of the gNB application.

In sum, with respect to the different prospective network configurations and server-based architectures described with reference to FIGS. 5 and 6, including the aggregated and disaggregated base stations, O-RANs, SMOs (including non-RT RICs), near-RT RICs or other network frameworks or modifications thereof, the principles of the present disclosure are intended to encompass any one or more of these implementations.

Figure 7:
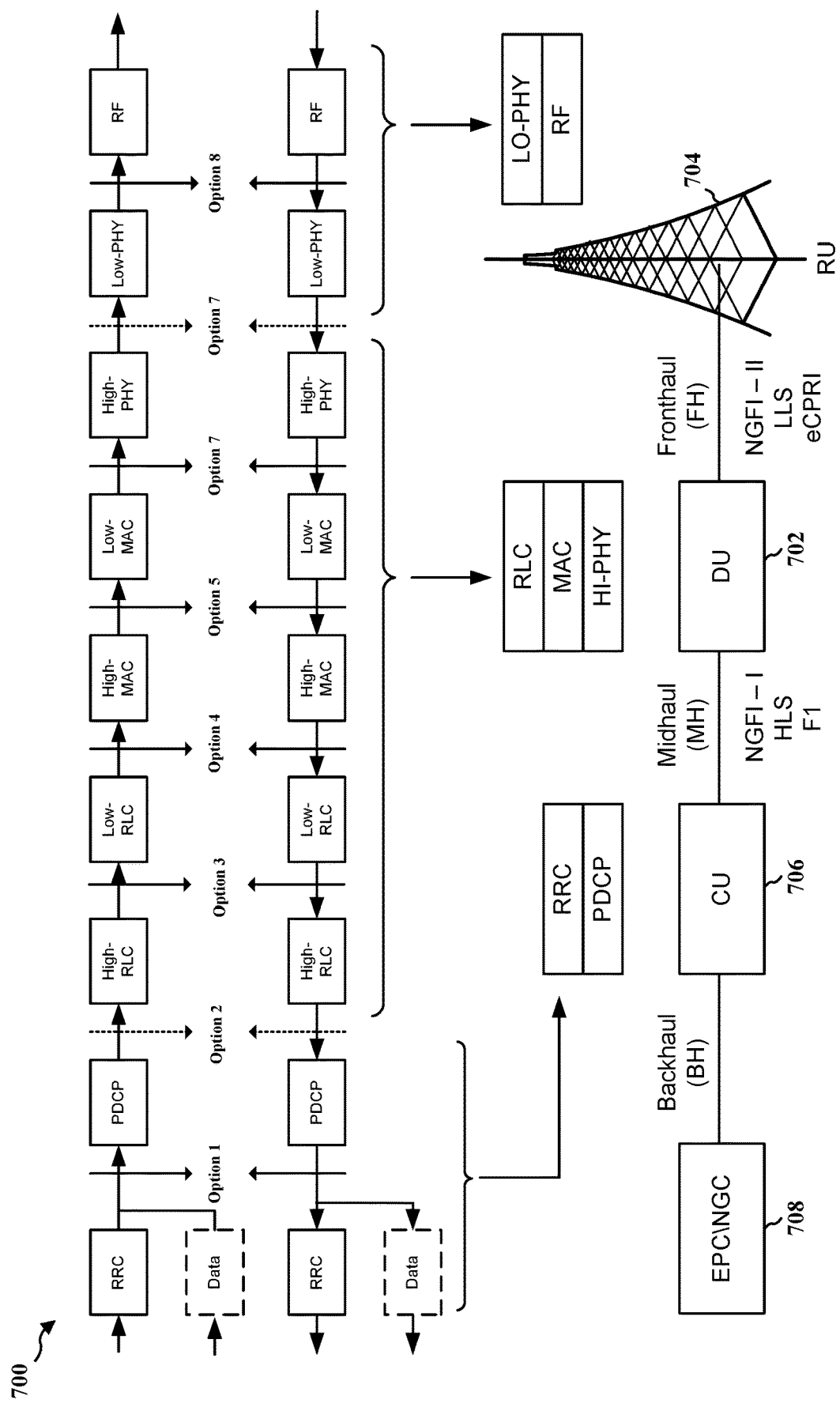
FIG. 7 is a diagram illustrating an example of functional split between a central unit and a distribute unit in a network.

FIG. 7 is a diagram 700 illustrating an example of functional split between a central unit (CU) 706 and a DU 702 in a network. The CU 706 may be a logical node that includes the base stations functions such as transferring of user data, mobility control, session management etc., except functions exclusive to the DU 702. The CU 706 may be connected to the core network (e.g., EPC 708) via a backhaul (BH) interface and may control the operation of multiple DUs 702 over a midhaul (e.g., MH or F1) interface. The DU 702 may be a logical node that includes a subset of the base station functions, where its operation may be controlled by the CU 706. The DU 702 may further be split or separated into the DU 702 and the RU 704 under the O-RAN architecture, such as described in connection with FIG. 5, where the DU 702 may communicate with the RU 704 via the FH interface. The network functionalities, such as functionalities associated with the PDCP, RLC, MAC, PHY network layers, etc., may be split between the CU 706, the DU 702 and the RU 704. For example, the functionalities may be split such that the CU 706 may be responsible for processing functionalities associated with the RRC and PDCP layers, the DU 702 may be responsible for processing functionalities associated with the RLC, MAC and HI-PHY (e.g., PHY-High) layers, and the RU 704 may be responsible for processing functionalities associated with the LO-PHY (e.g., PHY-Low) and RF layers, etc.

Figure 8A:
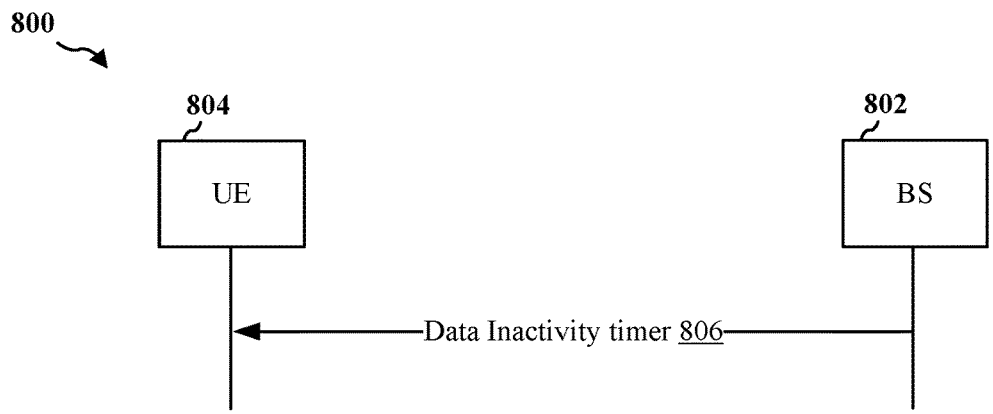
FIGS. 8A-8C are call-flow diagrams illustrating example communications between a UE and a network node.

FIG. 8A is a call-flow diagram 800 illustrating an example communication between a UE 804 (e.g., UE 104 of FIG. 1) and a base station 802 (e.g., base station 102 of FIG. 1). In this example, an RRC connection is established between the UE 804 and base station 802. In certain aspects, the base station 802 may configure the UE 804 with a defined period of time called a data inactivity timer 806 (e.g., DataInactivityTimer information element (IE)) associated with the RRC connection. The range of the data inactivity timer 806 may be up to 3 minutes (e.g., {s1, s2, s3, s5, s7, s10, s15, s20, s40, s50, s60, s80, s100, s120, s150, s180}). In some examples, if the base station 802 determines that the UE 804 does not have any traffic to send and/or receive during the defined period of time, then the base station 802 may initiate procedures to put the UE 804 in idle mode. When the UE 804 is idled due to expiration of the inactivity timer, existing connections such as signaling radio bearers (SRBs) and data radio bearers (DRBs) may be removed.

It should be noted, however, that the data inactivity timer 806 is an optional configuration. That is, the base station 802 may not always configure the UE 804 with the data inactivity timer 806. In such an example, the base station 802 does not know when the UE 804 let its RRC connection go idle. As such, the base station 802 may continue to reserve communication resources (e.g., time and/or frequency resources) and processing resources (e.g., scheduling resources) for the UE 804 even after the UE 804 is no longer active.

Figure 8B:
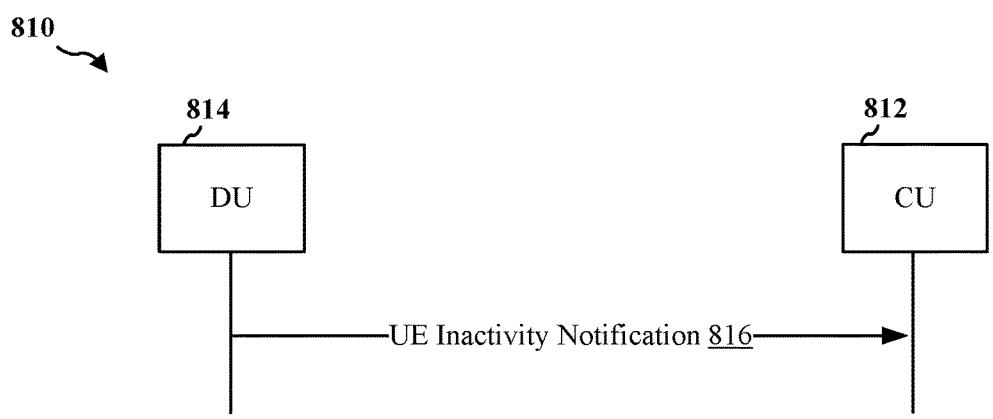

FIG. 8B is a call-flow diagram 810 illustrating an example communication between a DU 814 (e.g., DU 414/416/418 of FIG. 4, or DU 530 of FIG. 5) and a CU 812 (e.g., CU 454 of FIG. 4, or CU 510 of FIG. 5). Here, the DU 814 may perform wireless communication tasks for a UE, such as scheduling and physically communication with the UE, and the CU 812 may be configured to interact with the core network and terminate the RRC connection between the base station and the UE. In some examples, the CU 812 may configure the DU 814 to notify the CU 812 whenever the DU 814 determines that the UE is inactive. Thus, as illustrated, the DU 814 may provide a UE inactivity notification 816 to the CU 812 if the DU 814 determines that the UE is inactive. In some examples, the CU 812 may respond by removing the UE context.

The UE inactivity notification 816 may also include additional information. For example, during communication with the BS, the UE may request different services for different applications or processes running on the UE. Thus, for the different services, the base station may reserve different resources for the UE such as DRBs (e.g., where one DRB is for a voice call and another DRB is for downloading data). Over time, the UE may stop using a particular DRB and it may become idle for a period of time. In response to the idle state of that DRB, the DU 814 may determine that the DRB is inactive and include an identifier of that DRB in the UE inactivity notification to notify the CU 812 that this DRB is inactive. In this example, instead of deleting the UE context, the CU 812 may instead release only the DRB identified in the UE inactivity notification 816. By releasing the DRB, the CU 812 frees those resources and makes them available for use with another UE.

It should be noted that the DU 814 may not be relying on a timer (e.g., an inactivity timer) to determine when a particular DRB is inactive. Thus, as discussed in reference to FIG. 8A above, the base station (e.g., the DU 814) does not know when the UE will let its DRB go idle. As such, the base station may continue to reserve communication resources (e.g., time and/or frequency resources) and processing resources (e.g., scheduling resources) for a DRB for the UE even after the UE stops using the DRB.

Figure 8C:
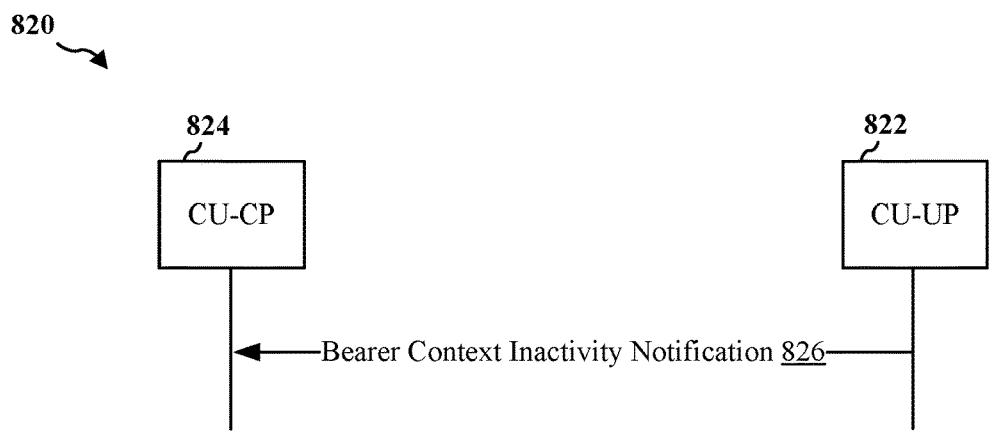

FIG. 8C is a call-flow diagram 820 illustrating an example communication between a CU-CP 824 (e.g., CU-CP 410 of FIG. 4, or CU-CP 660 of FIG. 6) and a CU-UP 822 (e.g., CU-UP 412 of FIG. 4, or CU-UP 661 of FIG. 6) of a CU. In some examples, the CU-CP 824 may configure the CU-UP 822 to notify the CU-CP 824 when the CU-UP 822 determines that a radio bearer is inactive. Thus, in such an example, the CU-UP 822 may monitor for inactivity of a radio bearer of a UE, and transmit a bearer context inactivity notification 826 to the CU-CP 824 if it determines inactivity. In certain aspects, the bearer context inactivity notification 826 may provide information of varying levels of granularity to the CU-CP 824. For example, at the highest level of granularity, the bearer context inactivity notification 826 may indicate that the UE (and all associated DRBs and protocol data units (PDUs)) is inactive. At another level of granularity, the bearer context inactivity notification 826 may indicate that a particular DRB associated with the UE is inactive (e.g., while another DRB associated with the UE remains active). At the lowest level of granularity, the bearer context inactivity notification 826 may indicate that a particular PDU session associated with the UE is inactive (e.g., while other PDU sessions remain active).

In some examples, the CU-UP 822 may determine that a UE, a DRB, and/or a PDU session is inactive if there have not been any associated communications within a timer period. For example, the time period may be an inactivity timer having a duration of up to 2 hours (e.g., 7200 seconds), based on configuration of the CU-UP 822.

The three examples illustrated in FIGS. 8A-8C and described above are examples of different aspects of the base station that "guess" at when the UE is inactive. Because of the relatively large windows of time provided by the timers, or because of the lack of any timer, the base station may be reserving resources that will not be used by the UE, and thereby depriving other devices of the use of those resources.

Figure 9:
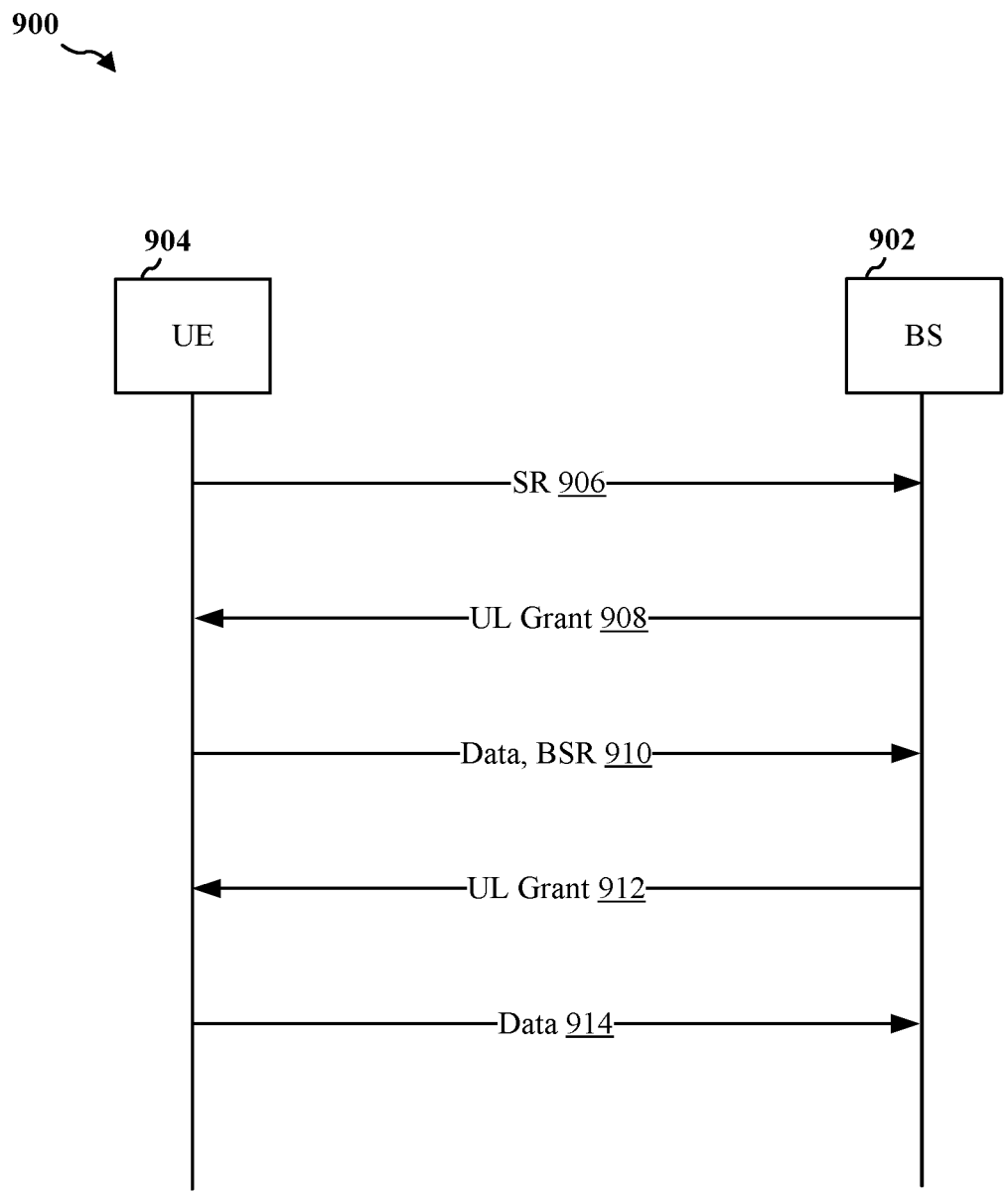
FIG. 9 is a call-flow diagram illustrating example communications between a UE and a network node.

FIG. 9 is a call-flow diagram 900 illustrating example communications between a UE 904 (e.g., UE 104 of FIG. 1) and a base station 902 (e.g., base station 102 of FIG. 1). In some examples, when the UE 904 has data to send to the base station 902, the UE 904 may transmit a scheduling request (SR) 906 to the base station 902 requesting an uplink grant. The SR 906 is configured to notify the base station 902 that the UE 904 has an uplink transmission. An SR 906 may correspond to one or more logical channels, to a recovery procedure for a beam failure with a secondary cell (SCell), and/or a recovery procedure for a listen-before-talk (LBT) failure. Each of the logical channel, the SCell beam failure recovery, and the LBT failure recovery may be mapped to zero or one SR configurations. These configurations may be configured at the UE 904 by the base station 902 via RRC messaging.

In response to the SR 906, the base station 902 may reserve and schedule resources for the uplink transmission and transmit an indication of the scheduling via an uplink grant 908 to the UE 904. Upon receiving the uplink grant 908, the UE 904 may send an uplink transmission 910 to the base station 902. However, the SR 906 may not provide the base station 902 with an indication of an amount of resources needed for the uplink transmission. As such, the uplink grant 908 may not provide the UE 904 with enough resources to include all the UE's data in the uplink transmission 910. For example, all of the data needed to be transmitted in the uplink transmission 910 may not fit within the granted uplink resources. Accordingly, the UE 904 may initially transmit a portion of the uplink data using the granted uplink resources and include a buffer status report (BSR) (e.g., padding BSR) with the transmitted portion of uplink data to notify the base station 902 that the UE 904 still has data for uplink transmission. Accordingly, the BSR may be used by the UE 904 to provide the base station 902 with information about uplink data volume (e.g., per one or more logical channel groups (LCGs)) in the medium access control (MAC) entity. In response to the BSR, the base station 902 may transmit another uplink grant 912 providing the UE 904 with enough resources to allow the UE 904 to transmit its remaining uplink data 914.

Note, that the UE may only send the SR when it has data for uplink communications, but when and how often the UE has data for uplink may be known by the UE, but is not known to the base station. As a result, the base station may be required to monitor for SRs from the UE continuously and blindly. As such, the base station uses a relatively large amount of energy even when it is not scheduling the UE. And if the base station is serving multiple UEs, even more energy is used.

Thus, in the examples illustrated in FIGS. 8A-8C and 9, a base station an use a significant amount of power waiting for a UE or monitoring the UE for uplink communications. That is, the base station uses a significant amount of power because it lacks information regarding upcoming activity of the UE.

Accordingly, it would be beneficial for the UE to provide assistance information to the base station to notify the base station of whether the UE is idle/inactive and for how long, when the base station can expect the UE to provide an SR or a BSR, and/or when the base station is expected to provide uplink resources to the UE. By providing the base station with assistance information, base station energy usage relating to waiting to determine inactivity of the UE and monitoring for SRs from the UE can be reduced. As such, the assistance information may help the base station perform procedures such as SR/BSR handling, RRC connection handling, resource reservation for UE radio bearers, etc. more efficiently Examples of Traffic Prediction for Network Energy Saving In certain aspects, a UE may provide assistance information to a base station where that assistance information is based on a prediction of future uplink traffic. For example, the UE may determine that it will not have any data to transmit to the base station for at least a window of time. That is, the UE may determine that it will not have any data to transmit in an uplink communication to the base station within a duration of the time window.

In certain aspects, the UE may use at least one of an artificial intelligence (AI) algorithm or predictability of uplink traffic patterns by a process running on the UE to determine whether to expect an uplink communication to occur within and/or after the time window. In one example, the AI algorithm may include a machine learning model (e.g., an artificial neural network) trained on uplink transmission patterns of the UE. In another example, the UE (and in some cases the AI algorithm) may recognize and determine expected patterns of arrival of data for uplink transmission. In this example, the data may include data that is generated on a periodic basis or another predictable basis for an application or process running on the UE, and/or data that part of an uploading operation. For example, a virtual reality (VR) application may have predictable uplink traffic patterns that the base station may not be aware of. In some examples, the UE may transmit an indication of an accuracy of the expected communication to the base station (e.g., in any of the UE transmissions illustrated in FIGS. 11-13).

FIG. 10 is a table 1000 illustrating an example implementation of UE assistance information. The table 1000 includes three columns: UE assistance information 1002, channel granularity 1004 of the assistance information, and signaling 1006 used to convey the assistance information to the base station.

In a first row 1008, the UE assistance information 1002 is upcoming uplink traffic expected after a configured/indicated time (e.g., the time window). For example, the UE may not have any uplink data or just incomplete/partial data presently, but the UE expects to have uplink data ready for uplink transmission after the time window. For example, the UE may provide UE assistance information 1002 that includes an indication of an expected uplink communication that will occur at a future time.

The expected uplink communication may be provided with a different channel granularity 1004, including a specified one or more logical channel groups (LCGs), or without specifying any LCGs and thereby applying to all scheduling. That is, the UE assistance information 1002 may include an indication of at least one LCG associated with the UE assistance information 1002, or no indication of an LCG in which case implies that the UE assistance information 1002 applies to all uplink scheduling (e.g., all LCGs) for communications between the UE and the base station.

With regard to signaling 1006, the expected uplink communication may be transmitted to the base station via a scheduling request (SR) and/or a buffer status report (BSR). Here, the UE may transmit an SR requesting a deferred uplink grant from the base station, where the uplink grant is deferred until the duration of the time window expires. Thus, after the time window, the base station may transmit an uplink grant to the UE. By providing the SR requesting a deferred uplink grant, the base station may end monitoring operations of the UE for the duration of the time window because the base station will not expect another SR from the UE within the time window. That is, the SR requesting a deferred uplink grant may implicitly indicate that the UE may not transmit another SR during the time window. This may reduce the amount of power consumed by the base station by, for example, allowing the base station to enter into a low power state by ending monitoring of the UE.

In some examples, the expected uplink communication may include an amount (e.g., in megabytes) of uplink data for a future uplink transmission. Thus, in some examples, the signaling 1006 may include a BSR with expected UL traffic. In this example, the UE may transmit the BSR requesting a future uplink grant for transmitting a particular amount of uplink data after the time window. Similarly, the BSR may implicitly indicate to the base station that the UE will not transmit another BSR or SR within the time window, thereby allowing the base station to reduce its power consumption for the duration of the time window.

In a second row 1010, the UE assistance information 1002 is upcoming uplink traffic expected after a configured/indicated time (e.g., the time window). For example, the UE may expect that it will not have any uplink data to transmit for the duration of the time window, nor does the UE expect to have uplink data ready for uplink transmission after the time window. Thus, in this example, the expected uplink communication is no communication for at least the duration of the time window.

In this example, if the UE assistance information 1002 is not directed to a particular LCG (e.g., the UE expects that it will not have any uplink data to transmit for the duration of the time window in all LCGs), then the UE may communicate the UE assistance information 1002 via an uplink control information (UCI) or a medium access control (MAC) control element (MAC-CE). The UCI or the MAC-CE may indicate that the UE may not transmit an SR to the base station for the duration of the time window. In the case of a particular LCG, the UE may transmit a BSR associated with the LCG wherein the BSR excludes an indication of the LCG. As such, the BSR may implicitly indicate that the UE may not transmit an SR to the base station for the omitted LCG for at least the duration of the time window.

Note that the UE assistance information of the first row 1008 and the second row 1010 may reduce the amount of power consumed by the base station because the assistance information provides the base station with an indication of upcoming activity of the UE. As a result, the base station may reduce the amount of time it spends monitoring the UE for SRs.

In a third row 1012, the UE assistance information 1002 is a request for RRC release. For example, the UE may expect that it will no longer use an RRC connection between it and the base station. Thus, in this example, the expected uplink communication is no communication for an indefinite period of time. Here, the request for RRC release may be transmitted to the base station via an RRC message, a UCI, or a MAC-CE.

Accordingly, the base station will not have to "guess" at when the UE is inactive with regard to the RCC connection. This may reduce the amount of power consumed by the base station because the base station may release the UE and stop monitoring the air interface for communications from the UE. In some examples, the base station may enter into a sleep mode for the duration of the time window.

In certain aspects, the base station and the UE may be pre-configured with the time window. That is, both the base station and the UE may understand a common duration of the time window based on a wireless standard or manufacturing requirement. In another example, one of the base station or the UE may be preconfigured with the time window, and may configure the other of the base station or the UE in a configuration message or in the UE assistance information message. In another example, the UE may dynamically determine a time window based on the uplink traffic patterns for example, and notify the base station of the time window in the UE assistance information message.

Figure 11:
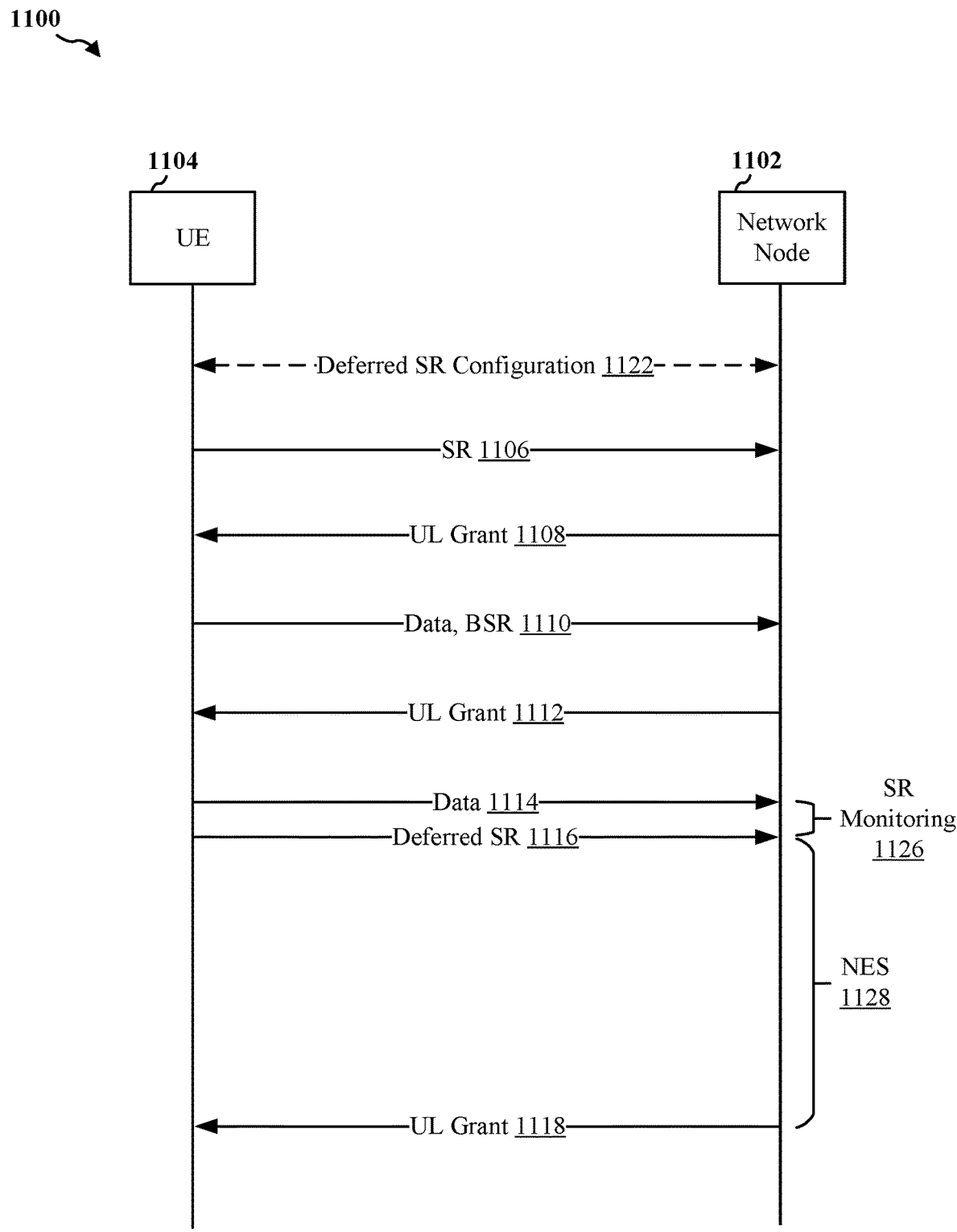
FIG. 11 is a call-flow diagram illustrating example communications between a UE and a network node.

FIG. 11 is a call-flow diagram 1100 illustrating example communications between a UE 1104 (e.g., UE 104 of FIG. 1) and a network node 1102 (e.g., base station 102 of FIG. 1; UE 104 of FIG. 1). In this example, the UE 1104 and network node 1102 may begin communications as illustrated in FIG. 9 (e.g., communications 906-914). The communications illustrated in FIG. 11 may relate to the SR requesting a deferred uplink grant illustrated in the first row 1008 of FIG. 10. Initially, at an optional configuration communication 1122, the UE 1104 may transmit to the network node 1102, an indication of a capability for determining whether to expect an uplink communication to occur after a time window. For example, the UE 1104 may notify the network node 1102 that it can determine a future uplink transmission and transmit a deferred SR to the network node 1102 requesting a future uplink grant for transmitting the future uplink transmission. In some examples, the UE 1104 may transmit the indication of the capability in response to a request, received from the network node 1102, for the indication of the expected communication.

In a first transmission 1106, the UE 1104 may transmit an SR to the network node 1102. In response to the SR, the network node 1102 may transmit an uplink grant in a second transmission 1108 to the UE 1104. In this example, the uplink grant does not provide enough resources for the UE 1104 to communicate all its data, so the UE transmits the data and a BSR in a third transmission 1110 to the network node 1102. The network node 1102 then transmits another uplink grant in a fourth transmission 1112 in response to the data and the BSR. The UE 1104 is then able to transmit the remaining data to the network node 1102 in a fifth transmission 1114.

Note that after the fifth transmission 1114, the network node 1102 will typically continue to monitor 1126 the air interface for another SR transmitted by the UE 1104. That is, the network node 1102 will continue to reserve air interface resources (e.g., time and frequency resources) and processing resources in order to be ready to respond to the UE 1104 when it is ready to transmit another uplink transmission because the network node 1102 does not necessarily know when the next uplink transmission will be.

Accordingly, the UE 1104 may transmit a deferred SR in a sixth transmission 1116 to the network node 1102. Here, the deferred SR is transmitted shortly after the last uplink data transmission in order to reduce the amount of time that the network node 1102 uses to monitor 1126 for an SR. In some examples, the deferred SR may be provided in the same transmission as the last uplink data transmission to eliminate an SR monitoring 1126 following receipt of the uplink data.

As discussed, the UE 1104 may determine, based on an AI and/or other pattern or prediction algorithm, that it will likely have uplink data to transmit at a future time. Accordingly, the UE 1104 may generate and transmit a deferred SR requesting an uplink grant for that future time. That is, the deferred SR may provide the network node 1102 with an indication of an expected uplink communication and a time when that communication is expected from the UE 1104. Because the deferred SR relates to an uplink transmission that is expected to occur in the future, there may be a time window between when the network node 1102 receives the deferred SR and when the network node 1102 transmits an uplink grant to the UE 1104 in response to the deferred SR. In some examples, the deferred SR may include an indication of at least one logic channel group (LCG) associated with the SR. That is, the deferred SR may be configured to indicate that the UE 1104 expects to transmit data at the future time over a particular LCG. In some examples, the deferred SR may be configured to identify a radio bearer to be used for an uplink communication at the future time. Thus, the deferred SR may provide the network node 1102 with an indication of a particular radio bearer for transmitting the future uplink transmission, and request that the uplink grant provide resources associated with the radio bearer.

Thus, in some examples, the time window is indicated by the deferred SR. For example, the deferred SR may indicate the duration of the time window by providing the network node 1102 with a time of the expected communication. That is, the duration of the time window is the amount of time between the receiving the deferred SR and transmitting the uplink grant in response to the deferred SR. However, in some examples, the network node 1102 may provide the UE 1104 with an indication of the duration of the time window. In another example, the UE 1104 and/or the network node 1102 may be configured prior to communication as part of a manufacturing step in accordance with a wireless standard or requirement.

During the time window, the network node 1102 may not expect any SRs or other uplink communications from the UE 1104 because the deferred SR provides an indication of the next expected uplink communication. As such, the network node 1102 may enter a network energy saving (NES) state 1128 (e.g., a low power state such as a sleep or idle state, or reduced processing state by ending monitoring for uplink communications from the UE 1104) during the time window. By entering into the NES state 1128, the network node 1102 may reduce its power consumption during the time window. In a seventh transmission 1118, the network node 1102 may transmit an uplink grant to the UE 1104 at the deferred time indicated by the deferred SR, ending the time window. Thus, the UE 1104 may receive, from the network node 1102 updated scheduling in response to the indication of the expected communication (e.g., the deferred SR) by way of the uplink grant of the seventh transmission 1118. In some examples, the updated scheduling (e.g., the uplink grant of the seventh transmission 1118) may include uplink resources (e.g., a scheduling update) associated with a radio bearer and/or an LCG associated with the radio bearer in response to the deferred SR of the sixth transmission 1116.

Figure 12:
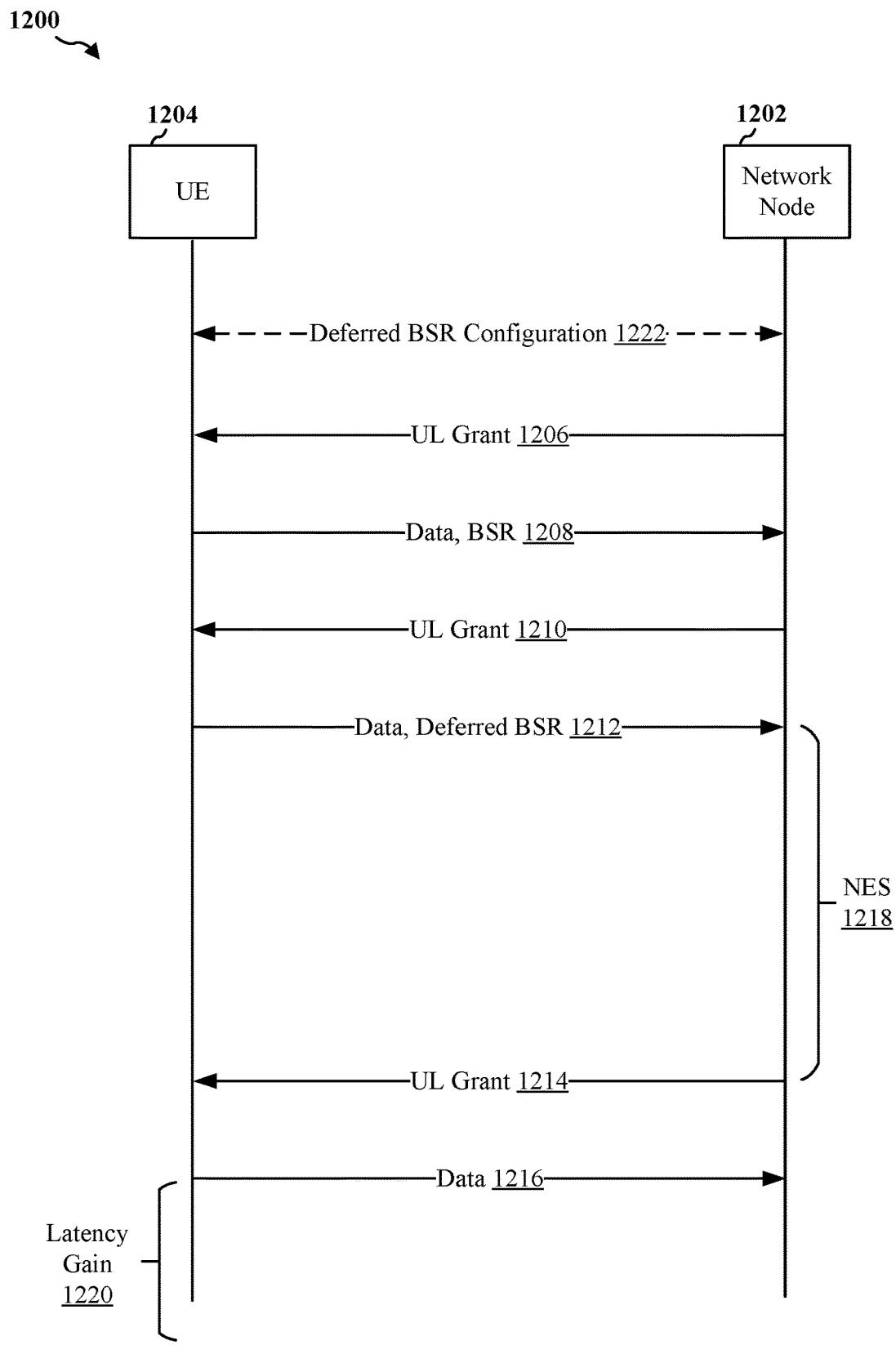
FIG. 12 is a call-flow diagram illustrating example communications between a UE and a network node.

FIG. 12 is a call-flow diagram 1200 illustrating example communications between a UE 1204 (e.g., UE 104 of FIG. 1) and a network node 1202 (e.g., base station 102 of FIG. 1; UE 104 of FIG. 1). In this example, the UE 1204 and network node 1202 may begin communications as illustrated in FIG. 9 (e.g., communications 908-912). The communications illustrated in FIG. 12 may relate to the BSR requesting a deferred uplink grant illustrated in the first row 1008 of FIG. 10. In this example, the UE 1204 and the network node 1202 have an RRC connection. The communications illustrated in FIG. 12 may relate to the SR requesting a deferred uplink grant illustrated in the first row 1008 of FIG. 10. Initially, at an optional configuration communication 1222, the UE 1204 may transmit to the network node 1202, an indication of a capability for determining whether to expect an uplink communication to occur after a time window. For example, the UE 1204 may notify the network node 1202 that it can determine a future uplink transmission and transmit a deferred BSR to the network node 1202 requesting a future uplink grant for transmitting the future uplink transmission. In some examples, the UE 1204 may transmit the indication of the capability in response to a request, received from the network node 1202, for the indication of the expected communication.

In this example, the network node 1202 transmits an uplink grant to the UE 1204 in a first transmission 1206. In this example, the uplink grant does not provide enough resources for the UE 1204 to communicate all its data, so the UE transmits the data and a BSR in a second transmission 1208 to the network node 1202. The network node 1202 then transmits another uplink grant in a third transmission 1210 in response to the data and the BSR. The UE 1204 is then able to transmit the remaining data to the network node 1202 in a fourth transmission 1212.

In this example, the UE 1204 transmits a deferred BSR along with the data of the fourth transmission 1212. Here, the deferred BSR is an indication of an expected communication from the UE 1204 to the network node 1202 that will happen in the future. That is, the deferred BSR may provide the network node 1202 with an indication of a time window between the time the network node 1202 receives the deferred BSR and the future time that the network node 1202 transmits an uplink grant to the UE 1204 in response to the deferred BSR.

In some examples, the deferred BSR includes an indication of an expected amount of data associated with the expected future communication. In another example, the deferred BSR identifies at least one LCG of a plurality of LCGs over which the UE will transmit the expected future communication. Accordingly, a single BSR may identify multiple LCGs, and an expected amount of data that will be transmitted in a future communication over each of the multiple LCGs. As such, the BSR may indicate to the network node 1202 that uplink communications are not expected for one or more LCGs during the time window, as all the uplink communications are expected to occur at a future time. In another example, a single BSR may identify a first LCG and a second LCG, and the single BSR may indicate that an uplink grant is requested immediately for the first LCG, while another uplink grant for the second LCG is requested for a future time. In some examples, the deferred BSR may be configured to identify a radio bearer to be used for an uplink communication at the future time. Thus, the deferred BSR may provide the network node 1202 with an indication of a particular radio bearer for transmitting the future uplink transmission, and request that the uplink grant provide resources associated with the radio bearer.

In the example illustrated in FIG. 12, the deferred BSR of the fourth transmission 1212 may be a single BSR directed to a single LCG. Thus, upon receiving the deferred BSR, the network node 1202 may enter into the NES state 1218 because it does not expect any uplink communications from the UE 1204. At the future time indicated by the deferred BSR, the network node 1202 may transmit an uplink grant in a fifth transmission 1214, where the uplink grant provides the UE 1204 with enough air-interface resources to transmit the expected amount of uplink data indicated in the deferred BSR. Accordingly, the UE 1204 may transmit uplink data to the network node 1202 in a sixth transmission 1216 using the resources provided in the uplink grant. Thus, the UE 1204 may receive, from the network node 1202 updated scheduling in response to the indication of the expected communication (e.g., the deferred BSR) by way of the uplink grant of the fifth transmission 1214. In some examples, the updated scheduling (e.g., the uplink grant of the fifth transmission 1214) may include uplink resources (e.g., a scheduling update) associated with a radio bearer and/or an LCG associated with the radio bearer in response to the deferred BSR of the fourth transmission 1212.

It should be noted that in this example, the UE 1204 does not have to send another BSR with the data of the sixth transmission 1216 because the UE 1204 has already provided the network node 1202 with the amount of data it needs to send via the deferred BSR. As such, the network node 1202 does not need to send multiple uplink transmissions to the UE 1204 as it did in the first transmission 1206 and the third transmission 1210. Thus, a latency gain 1220 may be experienced by both the UE 1204 and the network node 1202 relative to the example illustrated in FIG. 9.

In another example, the deferred BSR may indicate no traffic for period of time on one or more LCGs identified in the BSR. This example may relate to the BSR requesting a deferred uplink grant illustrated in the second row 1010 of FIG. 10. In this example, the deferred BSR may exclude an explicit identification of one or more LCGs or may exclude those LCGs. In such an example, the deferred BSR may implicitly indicate that no uplink traffic is planned for the one or more LCGs for at least a window of time having a duration indicated in the deferred BSR or as preconfigured at the UE 1204 and the network node 1202. As such, the network node 1202 may enter into the NES state 1218 for the duration of time. At the end of the duration of time, the UE 1204 may transmit an uplink communication requesting resources, deferred resources, or another indication that no traffic is expected for the period of time. In some examples, if no communication from the UE 1204 is received by the network node 1202 after expiration of the time window, then the network node 1202 may proceed to release the RRC connection.

Figure 13:
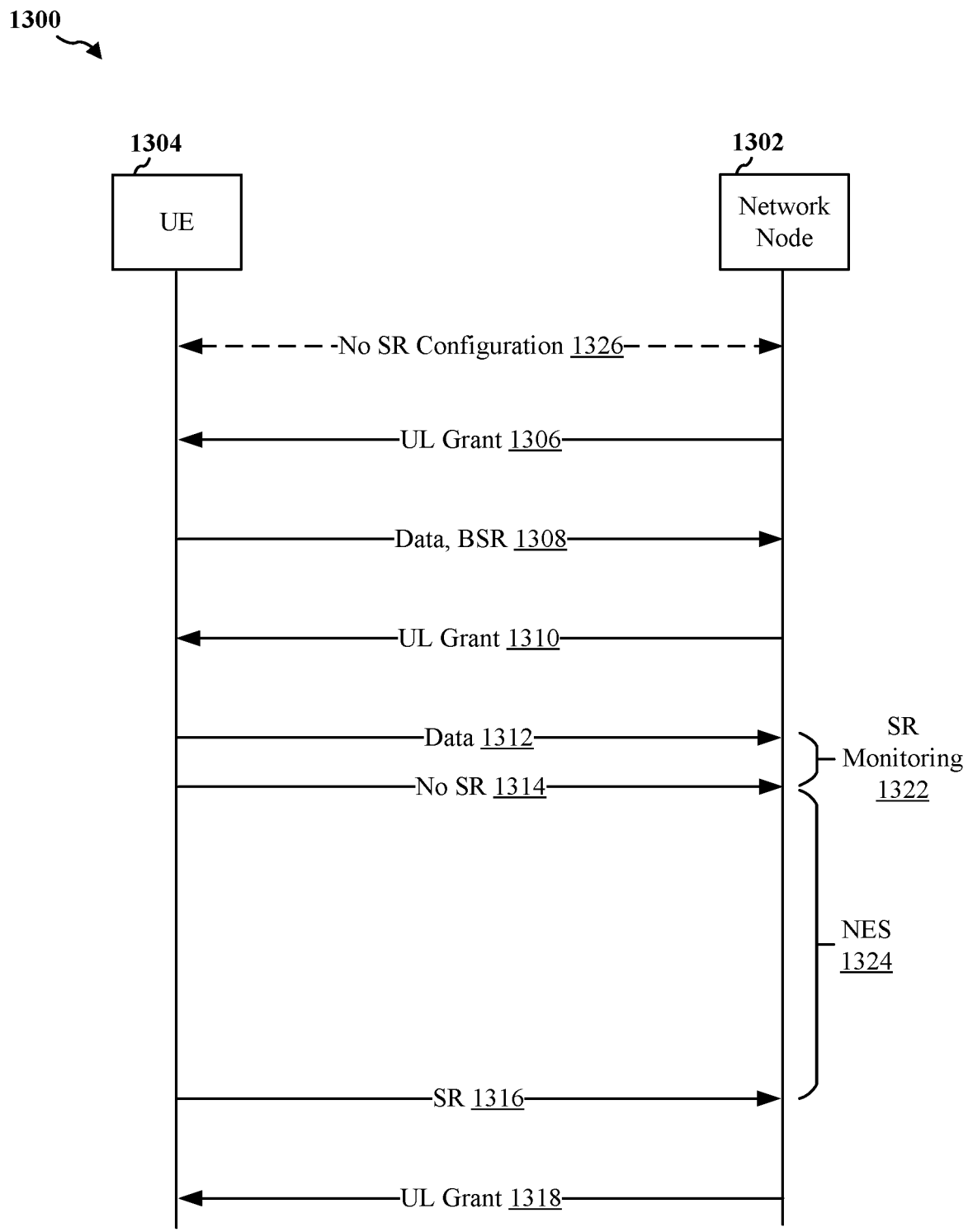
FIG. 13 is a call-flow diagram illustrating example communications between a UE and a network node.

FIG. 13 is a call-flow diagram 1300 illustrating example communications between a UE 1304 (e.g., UE 104 of FIG. 1) and a network node 1302 (e.g., base station 102 of FIG. 1; UE 104 of FIG. 1). In this example, the UE 1304 and network node 1302 may begin communications as illustrated in FIG. 9 (e.g., communications 908-914). The communications illustrated in FIG. 13 may relate to the SR requesting a deferred uplink grant illustrated in the second row 1010 of FIG. 10. In this example, the UE 1304 and the network node 1302 have an RRC connection. Initially, at an optional configuration communication 1326, the UE 1304 may transmit to the network node 1302, an indication of a capability for determining whether to expect an uplink communication to occur after a time window. For example, the UE 1304 may notify the network node 1302 that it can determine whether it will transmit a future uplink transmission within a time window, and transmit an indication to the network node 1302 that it will not request uplink scheduling within the time window. In some examples, the UE 1304 may transmit the indication of the capability in response to a request, received from the network node 1302, for the indication of the expected communication.

In this example, the network node 1302 transmits an uplink grant to the UE 1304 in a first transmission 1306. The uplink grant does not provide enough resources for the UE 1304 to communicate all its data, so the UE 1304 transmits the data and a BSR in a second transmission 1308 to the network node 1302. The network node 1302 then transmits another uplink grant in a third transmission 1310 in response to the data and the BSR. The UE 1304 is then able to transmit the remaining data to the network node 1302 in a fourth transmission 1312.

As illustrated, in a fifth transmission 1314, the UE 1304 may transmit an uplink message indicating to the network node 1302 that the UE 1304 will not be transmitting a uplink communication for at least the duration of a time window. The duration of the time window may be indicated in the message, or may be a duration configured at the UE 1304 by the network node 1302. In some examples, the duration may be configured at the UE 1304 and network node 1302 prior to the communication (e.g., during manufacturing). The fifth transmission 1314 may include a uplink control information (UCI), backhaul adaptation protocol (BAP), RRC messaging, or MAC CE configured to indicate that the UE 1304 will not transmit an SR within the time window. In some examples, the indication may be transmitted with the data of the fourth transmission 1312 (e.g., in a BSR).

In this example, SR monitoring 1322 by the network node 1302 is reduced (e.g., the network node 1302 no longer monitors for uplink transmissions by the UE 1304), allowing the network node 1302 to enter an NES state 1324 for the duration of the time window. Once the time window expires, the UE 1304 may transmit another indication that it will not be transmitting for another time window, or the UE 1304 may transmit 1316 another SR in a sixth transmission 1316 requesting an uplink grant. In response to the SR, the network node 1302 may transmit an uplink grant to the UE 1304 in a seventh transmission 1318. Thus, as in the examples of FIGS. 11 and 12, the network node 1302 may update its scheduling of the UE 1304 in response to the message indicating that it will not be transmitting an uplink communication for at least the duration of a time window (e.g., the deferred SR of FIG. 11 and the deferred BSR of FIG. 12). Thus, in this example, by not receiving a response from the network node 1302, the UE 1304 implicitly obtains updated scheduling from the network node 1302 because the UE 1304 may interpret the non-response as an indication that the network node 1302 will not monitor for UE 1304 transmissions for at the time window. In another example, the network node 1302 may transmit an ACK or another indication of an RRC connection release to the UE 1304.

In some examples, the message indicating that the UE 1304 will not be transmitting a uplink communication for at least the duration of the time window may indicate to the network node 1302 that the UE 1304 expects an uplink communication after the time window. As such, the network node 1302 may expect that the UE 1304 will output an SR or a BSR for transmission to the network node 1302 after the time window.

It should be noted that in any of the examples illustrated in FIGS. 11-13 (e.g., the deferred SR of the sixth transmission 1116, the deferred BSR of the fourth transmission 1212, or the indication of no SR in the fifth transmission 1314), the UE may include in the transmission an indication of a particular radio bearer and a request to release the radio bearer. In the examples of FIGS. 11 and 12, the network node may indicate release of the radio bearer to the UE via, for example, an uplink grant (e.g., the uplink grant of the seventh transmission 1118 or the uplink grant of the fifth transmission 1214).

Figure 14:
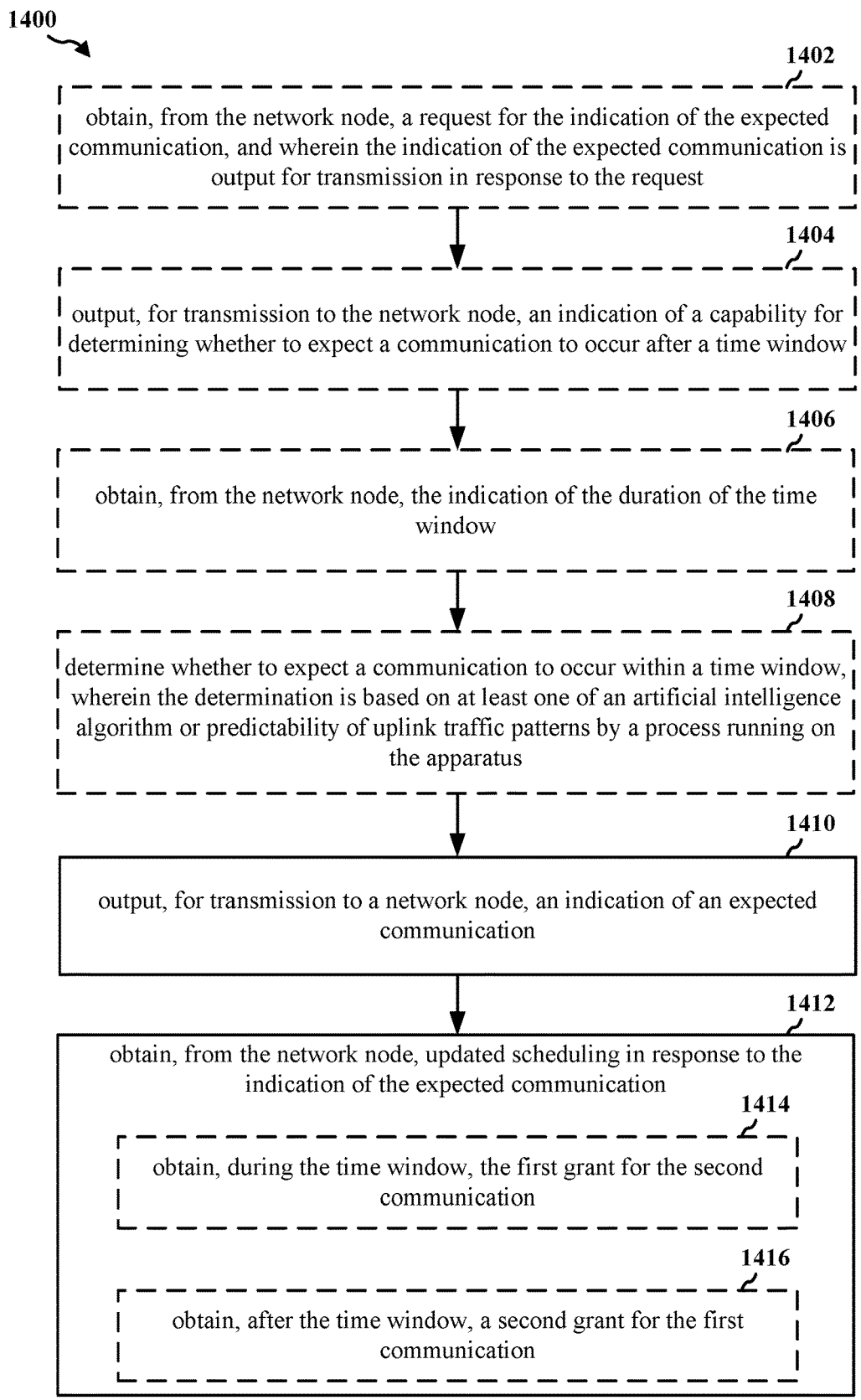
FIG. 14 is a flowchart of a method of wireless communication.

FIG. 14 is a flowchart 1400 of a method of wireless communication. The method may be performed by a UE (e.g., the UE 104 of FIG. 1; the apparatus 1502 of FIG. 15).

At a first step 1402, the UE may optionally obtain, from a network node, a request for an indication of an expected communication, wherein the indication of the expected communication is output for transmission in response to the request. In certain aspects, the first step 1402 may be performed by a capability request receiving component 1540 of the apparatus 1502. In one example, a network node (e.g., a base station, or a disaggregated portion of a base station) may transmit a request to the UE to get confirmation that the UE has a capability to predict future uplink/sidelink transmissions. For example, the UE may use at least one of an artificial intelligence (AI) algorithm or another algorithm suitable for predicting uplink/sidelink traffic patterns of a process running on the UE to determine whether to expect a future uplink communication to occur within and/or after a time window.

At a second step 1404, the UE may optionally output, for transmission to the network node, an indication of a capability for determining whether to expect an communication to occur after a time window. For example, the second step 1404 may be performed by a capability indication component 1542. In certain aspects, in response to the request received in the first step 1402, the UE may transmit an indication of its capability to predict future uplink/sidelink communications occurring within and/or after a time window. It should be noted that the UE may transmit the indication of the capability to the network node on its own without receiving a request from the network node. The first step 1402 and the second step 1404 may be part of the communications illustrated in the configuration communications 1122/1222/1326 of FIGS. 11-13.

At a third step 1406, the UE may optionally obtain, from the network node, the indication of the duration of the time window. For example, the third step 1406 may be performed by a time window component 1544. In certain aspects, the network node may configure the UE with a time window duration. The configuration of the time window duration may be part of the communications illustrated in the configuration communications 1122/1222/1326 of FIGS. 11-13. In one example, the time window duration may relate to a duration of a time window between a deferred SR and an uplink grant (e.g., as illustrated in FIG. 11). In another example, the time window duration may relate to a duration of a time window between a deferred BSR and an uplink grant (e.g., as illustrated in FIG. 12). In another example, the time window duration may relate to a duration of a time window between an indication of no SR transmitted by the UE and an SR or another indication of no SR transmitted by the UE (e.g., as illustrated in FIG. 13). In yet another example, the time window duration may relate to a duration of a time window between an indication of no SR transmitted by the UE and when the network node will begin an RRC connection release process.

In certain aspects, the expected communication comprises data to be output for transmission after a time window, and wherein at least one of the indication of the expected communication comprises an indication of a duration of the time window or the apparatus is further configured to obtain, from the network node, the indication of the duration of the time window.

At a fourth step 1408, the UE may optionally determine whether to expect a communication to occur within a time window, wherein the determination is based on at least one of an artificial intelligence algorithm or predictability of traffic patterns by a process running on the apparatus. For example, the fourth step 1408 may be performed by a future communication component 1546. In certain aspects, the UE may determine, based on any suitable algorithm, whether it can expect to have data at a future point in time for an uplink/sidelink transmission. For example, a UE may determine that a process or application running on the UE has a predictable pattern of uplink transmissions (e.g., a virtual reality (VR) application, or uploading a large file, etc.). Based on a determination that the UE will likely have a future uplink transmission, the UE may notify the network node that the next uplink transmission will be in the future (e.g., via a deferred SR illustrated in FIG. 11 or a deferred BSR illustrated in FIG. 12). This will allow the network node to enter into an NES state to save power until the next uplink transmission. In another example, the UE may determine that it will have no data to upload for at least a time window (e.g., based on AI or machine learning and patterns of UE use). In this example, the UE may notify the network node that it will have no uplink/sidelink transmissions for at least the time window, thereby allowing the network node to enter into the NES state.

In certain aspects, the determination is based at least in part on the artificial intelligence algorithm, and wherein the indication of the expected communication comprises an indication of an accuracy of the expected communication.

At a fifth step 1410, the UE may output, for transmission to a network node, an indication of an expected communication. For example, the fifth step 1410 may be performed by an expectation output component 1548. In certain aspects, if the UE predicts that it will or will not have data to transmit at a future time, then the UE may transmit an indication of an expected uplink/sidelink transmission or the lack thereof. The indication may be transmitted as a deferred SR, a deferred BSR, or a no SR indication (e.g., an uplink control information (UCI), a medium access-control (MAC) control element (MAC-CE), a backhaul adaptation protocol (BAP), or radio resource control (RRC) messaging).

At a sixth step 1412, the UE may obtain, from the network node, updated scheduling in response to the indication of the expected communication. For example, the sixth step 1412 may be performed by an updated scheduling component 1550. In certain aspects, the UE may receive, from the network node, updated scheduling by way of the uplink grant in response to the indication of the expected communication (e.g., the deferred SR/BSR). In some examples, the updated scheduling (e.g., the uplink grant of the seventh transmission 1118 of FIG. 11) may include uplink resources (e.g., an update to uplink scheduling caused by the indication of the expected communication). In another aspect, by not receiving a response from the network node to a no SR indication, the UE implicitly obtains updated scheduling from the network node because the UE may interpret the non-response as an indication that the network node will not monitor for UE transmissions for at the time window. In this manner, uplink/sidelink scheduling is updated to provide no scheduling during a time window. In another example, the network may transmit an ACK or another indication of an RRC connection release to the UE in response to a no SR indication.

In certain aspects, the indication of the expected communication is configured to indicate that the apparatus will output a scheduling request (SR) or a buffer status report (BSR) for transmission to the network node after a time window.

In certain aspects, the indication of the expected communication comprises a scheduling request (SR) configured to request a deferred grant for a communication expected to be communicated after a time window.

In certain aspects, the indication of the expected communication further comprises an indication of at least one logic channel group (LCG) associated with the SR.

In certain aspects, the indication of the expected communication comprises a buffer status report (BSR) configured to indicate an expected amount of data associated with a first uplink communication for at least a first logic channel group (LCG) of a plurality of LCGs after a time window.

In certain aspects, the BSR is further configured to indicate that communications are not expected for at least the first LCG during the time window.

In certain aspects, the BSR is further configured to indicate a current amount of data associated with a second communication for a second LCG of the plurality of LCGs, and wherein the BSR is further configured to solicit a first grant for the second communication.

In certain aspects, the indication of the expected communication is configured to identify a radio bearer to be used for an communication.

In certain aspects, the updated scheduling comprises a scheduling update of the radio bearer or a logic channel group (LCG) associated with the radio bearer in response to the indication of the expected communication.

In certain aspects, the indication of the expected communication is configured to request release of a radio bearer, and wherein the updated scheduling comprises an indication of release of the radio bearer.

In certain aspects, the indication of the expected communication is configured to request release of an RRC connection between the apparatus and the network node, and wherein the updated scheduling comprises an indication of release of the RRC connection.

In certain aspects, the indication of the expected communication is output for transmission via at least one of an uplink control information (UCI), a medium access-control (MAC) control element (MAC-CE), a backhaul adaptation protocol (BAP), or radio resource control (RRC) messaging.

In certain aspects, the expected communication comprises data to be output for transmission after a time window, and wherein the apparatus is preconfigured with a duration of the time window.

At a seventh step 1414 and an eighth step 1416, the UE may optionally obtain, during a time window, a first grant for a second communication, and obtain, after the time window, a second grant for a first communication. For example, the seventh step 1414 and the eighth step 1416 may be performed by a multiple scheduling component 1552. In certain aspects, the UE may transmit a deferred SR or deferred BSR to the network node requesting: (i) an uplink grant for a current communication, and (ii) a deferred uplink grant for a second communication. That is, the UE may determine that it has uplink data to transmit both now and in the future. Thus, in a single deferred SR or deferred BSR, the UE may request both an uplink grant now and another uplink grant after time window.

Figure 15:
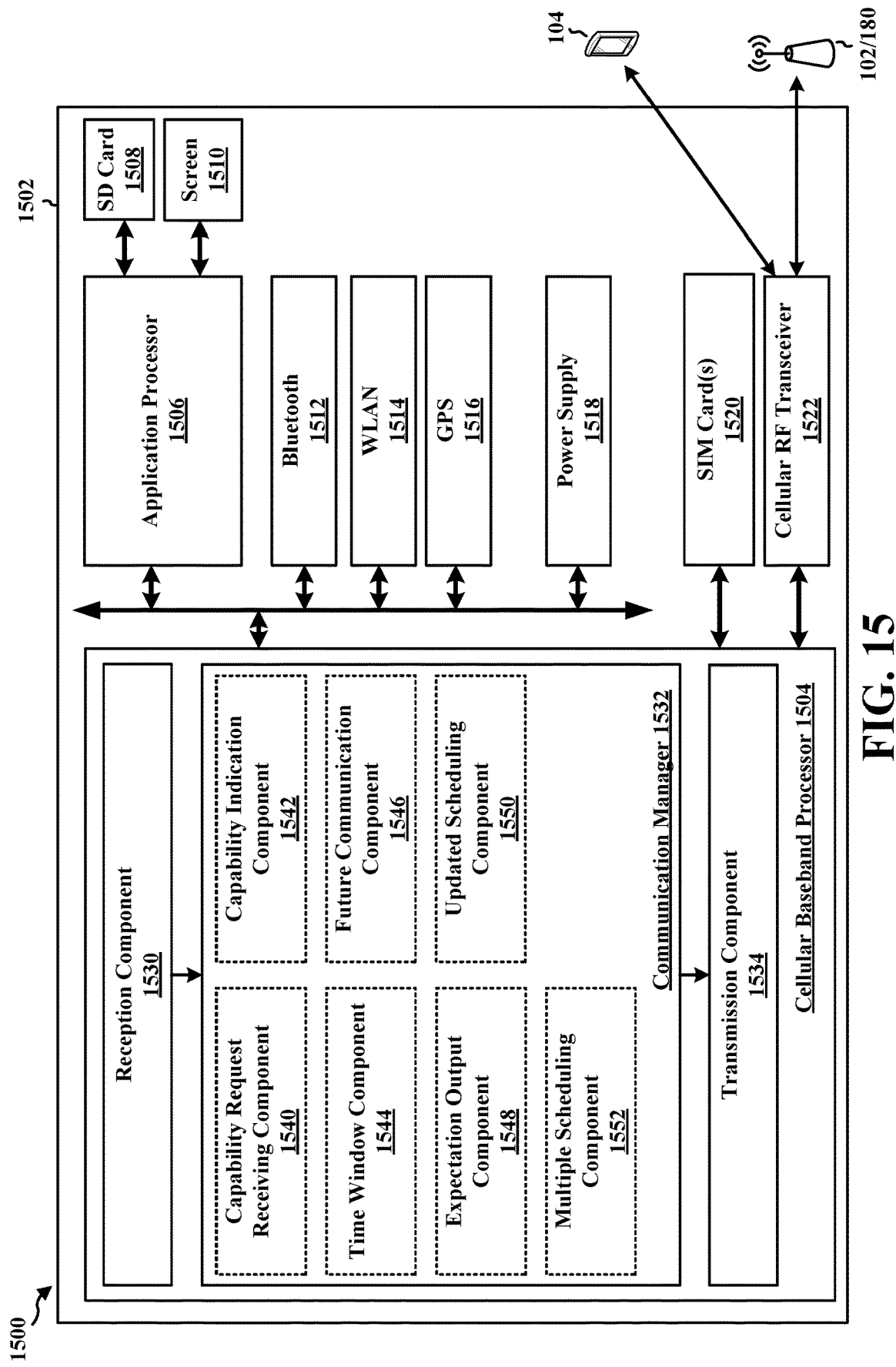
FIG. 15 is a diagram illustrating an example of a hardware implementation for an example apparatus.

FIG. 15 is a diagram 1500 illustrating an example of a hardware implementation for an apparatus 1502. The apparatus 1502 is a UE and includes a cellular baseband processor 1504 (also referred to as a modem) coupled to a cellular RF transceiver 1522 and one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, and a power supply 1518. The cellular baseband processor 1504 communicates through the cellular RF transceiver 1522 with the UE 104 and/or BS 102/180. The cellular baseband processor 1504 may include a computer-readable medium/memory. The computer-readable medium/memory may be non-transitory. The cellular baseband processor 1504 is responsible for general processing, including the execution of software stored on the computer-readable medium/memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the cellular baseband processor 1504. The cellular baseband processor 1504 may be a component of the UE 104 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., UE 104 of FIGS. 1 and 3) and include the aforementioned additional modules of the apparatus 1502.

The communication manager 1532 includes a capability request receiving component 1540 that is configured to receive or obtain, from the network node, a request for the indication of the expected communication, and wherein the indication of the expected communication is output for transmission in response to the request; e.g., as described in connection with the first step 1402 of FIG. 14.

The communication manager 1532 includes a capability indication component 1542 that is configured to transmit or output, for transmission to the network node, an indication of a capability for determining whether to expect a communication to occur after a time window; e.g., as described in connection with the second step 1404 of FIG. 14.

The communication manager 1532 includes a time window component 1544 that is configured to receive or obtain, from the network node, the indication of the duration of the time window; e.g., as described in connection with the third step 1406 of FIG. 14.

The communication manager 1532 includes a future communication component 1546 that is configured to determine whether to expect a communication to occur within a time window, wherein the determination is based on at least one of an artificial intelligence algorithm or predictability of traffic patterns by a process running on the apparatus; e.g., as described in connection with the fourth step 1408 of FIG. 14.

The communication manager 1532 includes an expectation output component 1548 that is configured to transmit or output, for transmission to a network node, an indication of an expected communication; e.g., as described in connection with the fifth step 1410 of FIG. 14.

The communication manager 1532 includes an updated scheduling component 1550 that is configured to receive or obtain, from the network node, updated scheduling in response to the indication of the expected communication; e.g., as described in connection with the sixth step 1412 of FIG. 14.

The communication manager 1532 includes a multiple scheduling component 1552 that is configured to receive or obtain, during a time window, a first grant for a second communication, and receive or obtain, after the time window, a second grant for a first communication; e.g., as described in connection with the seventh step 1414 and the eighth step 1416 of FIG. 14.

The apparatus may include additional components that perform each of the blocks of the algorithm in the aforementioned flowchart of FIG. 14. As such, each block in the aforementioned flowchart may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the cellular baseband processor 1504, includes means for transmitting, or outputting, for transmission to a network node, an indication of an expected communication; means for receiving or obtaining, from the network node, updated scheduling in response to the indication of the expected communication; means for receiving or obtaining, from the network node, the indication of the duration of the time window; means for receiving or obtaining, during the time window, the first grant for the second communication; means for receiving or obtaining, after the time window, a second grant for the first communication; means for transmitting or outputting, for transmission to the network node, an indication of a capability for determining whether to expect an communication to occur after a time window; means for receiving or obtaining, from the network node, a request for the indication of the expected communication, and wherein the indication of the expected communication is output for transmission in response to the request; and means for determining whether to expect an communication to occur within a time window, wherein the determination is based on at least one of an artificial intelligence algorithm or predictability of traffic patterns by a process running on the apparatus.

The aforementioned means may be one or more of the aforementioned components of the apparatus 1502 configured to perform the functions recited by the aforementioned means. As described supra, the apparatus 1502 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 16:
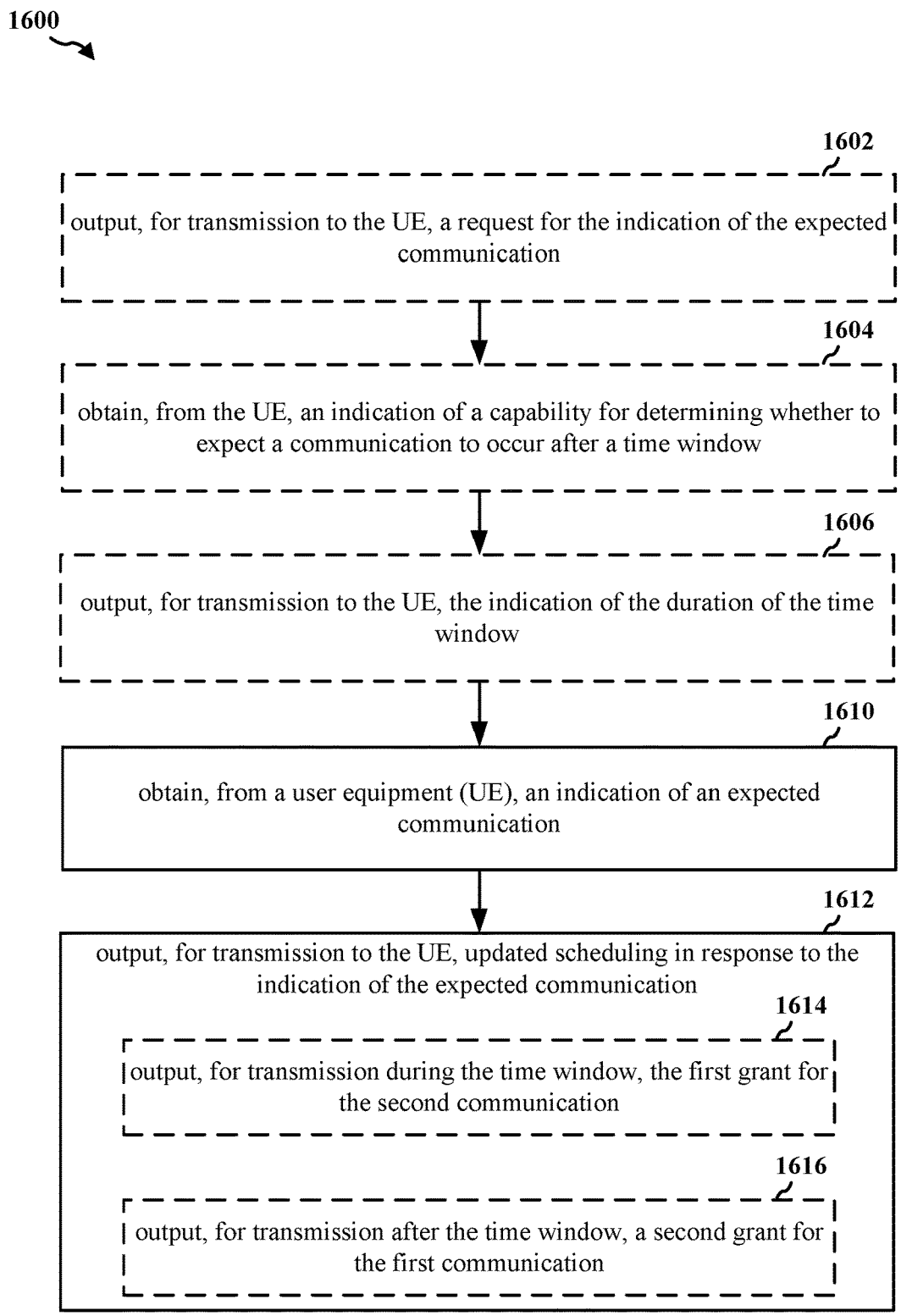
FIG. 16 is a flowchart of a method of wireless communication.

FIG. 16 is a flowchart 1600 of a method of wireless communication. The method may be performed by a network node (e.g., the base station 102/180 of FIG. 1; UE 102 of FIG. 1; the apparatus 1702 of FIG. 17) or a disaggregated/aggregated element of the network node.

At a first step 1602, the network node may optionally output, for transmission to the UE, a request for the indication of the expected communication. For example, the first step 1602 may be performed by a request component 1740. In certain aspects, the network node may transmit a request to the UE to get confirmation that the UE has a capability to predict future transmissions. For example, the UE may use at least one of an artificial intelligence (AI) algorithm or another algorithm suitable for predicting traffic patterns of a process running on the UE to determine whether to expect a future communication to occur within and/or after a time window. The network node may request that the UE provide an indication of whether is supports such a capability.

At a second step 1604, the network node may optionally obtain, from the UE, an indication of a capability for determining whether to expect an communication to occur after a time window. For example, the second step 1604 may be performed by a capability receiving component 1742. In certain aspects, in response to the request transmitted in the first step 1602, the network node may receive an indication of the UEs capability to predict future communications occurring within and/or after a time window. It should be noted that the UE may transmit the indication of the capability to the network node on its own without receiving a request from the network node. The first step 1602 and the second step 1604 may be part of the communications illustrated in the configuration communications 1122/1222/1326 of FIGS. 11-13.

At a third step 1606, the network node may optionally output, for transmission to the UE, the indication of the duration of the time window. For example, the third step 1606 may be performed by an indication transmitting component 1744. In certain aspects, the network node may configure the UE with a time window duration. The configuration of the time window duration may be part of the communications illustrated in the configuration communications 1122/1222/1326 of FIGS. 11-13. In one example, the time window duration may relate to a duration of a time window between a deferred SR and an grant (e.g., as illustrated in FIG. 11). In another example, the time window duration may relate to a duration of a time window between a deferred BSR and an grant (e.g., as illustrated in FIG. 12). In another example, the time window duration may relate to a duration of a time window between an indication of no SR transmitted by the UE and an SR or another indication of no SR transmitted by the UE (e.g., as illustrated in FIG. 13). In yet another example, the time window duration may relate to a duration of a time window between an indication of no SR transmitted by the UE and when the network node will begin an RRC connection release process.

At a fourth step 1610, the network node may obtain, from a UE, an indication of an expected communication. For example, the fourth step 1610 may be performed by an indication receiving component 1746. In certain aspects, the UE may determine, based on any suitable algorithm, whether it can expect to have data at a future point in time for an uplink/sidelink transmission. For example, a UE may determine that a process or application running on the UE has a predictable pattern of uplink/sidelink transmissions (e.g., a virtual reality (VR) application, or uploading a large file, etc.). Based on a determination that the UE will likely have a future uplink/sidelink transmission, the UE may notify the network node that the next uplink/sidelink transmission will be in the future (e.g., via a deferred SR illustrated in FIG. 11 or a deferred BSR illustrated in FIG. 12). This will allow the network node to enter into an NES state to save power until the next uplink/sidelink transmission. In another example, the UE may determine that it will have no data to upload for at least a time window (e.g., based on AI or machine learning and patterns of UE use). In this example, the UE may notify the network node that it will have no uplink/sidelink transmissions for at least the time window, thereby allowing the network node to enter into the NES state.

At a fifth step 1612, the network node may output, for transmission to the UE, updated scheduling in response to the indication of the expected communication. For example, the fifth step 1612 may be performed by an updating component 1748. In certain aspects, the UE may receive, from the network node, updated scheduling by way of the uplink grant in response to the indication of the expected communication (e.g., the deferred SR/BSR). In some examples, the updated scheduling (e.g., the uplink grant of the seventh transmission 1118 of FIG. 11) may include uplink resources (e.g., an update to uplink scheduling caused by the indication of the expected communication). In another aspect, by not receiving a response from the network node to a no SR indication, the UE implicitly obtains updated scheduling from the network node because the UE may interpret the non-response as an indication that the network node will not monitor for UE transmissions for at the time window. In this manner, uplink scheduling is updated to provide no scheduling during a time window. In another example, the network may transmit an ACK or another indication of an RRC connection release to the UE in response to a no SR indication.

In certain aspects, the expected communication comprises data to be output for transmission after a time window, and wherein at least one of: the indication of the expected communication comprises an indication of a duration of the time window, or the apparatus is further configured to output, for transmission to the UE, the indication of the duration of the time window.

In certain aspects, the indication of the expected communication is configured to indicate that the UE will output a scheduling request (SR) or a buffer status report (BSR) for transmission to the apparatus after a time window.

In certain aspects, the indication of the expected communication comprises a scheduling request (SR) configured to request a deferred grant for a communication expected to be communicated after a time window.

In certain aspects, the indication of the expected communication further comprises an indication of at least one logic channel group (LCG) associated with the SR.

In certain aspects, the indication of the expected communication comprises a buffer status report (BSR) configured to indicate an expected amount of data associated with a first communication for at least a first logic channel group (LCG) of a plurality of LCGs after a time window.

In certain aspects, the BSR is further configured to indicate that communications are not expected for at least the first LCG during the time window.

In certain aspects, the BSR is further configured to indicate a current amount of data associated with a second communication for a second LCG of the plurality of LCGs, and wherein the BSR is further configured to solicit a first grant for the second communication.

In certain aspects, the indication of the expected communication is configured to identify a radio bearer to be used for a communication.

In certain aspects, the updated scheduling comprises a scheduling update of the radio bearer or a logic channel group (LCG) associated with the radio bearer in response to the indication of the expected communication.

In certain aspects, the indication of the expected communication is configured to request release of a radio bearer, and wherein the updated scheduling comprises an indication of release of the radio bearer.

In certain aspects, the indication of the expected communication is configured to request release of an RRC connection between the apparatus and the UE, and wherein the updated scheduling comprises an indication of release of the RRC connection.

In certain aspects, the indication of the expected communication is obtained via at least one of an uplink control information (UCI), a medium access-control (MAC) control element (MAC-CE), a backhaul adaptation protocol (BAP), or radio resource control (RRC) messaging.

In certain aspects, the expected communication comprises data to be obtained after a time window, and wherein the apparatus is preconfigured with a duration of the time window.

At a sixth step 1614 and a seventh step 1616, the network node may optionally output, for transmission during the time window, the first grant for the second communication, and output, for transmission after the time window, a second grant for the first communication. For example, the sixth step 1614 and the seventh step 1616 may be performed by multiple scheduling component 1650. In certain aspects, the UE may transmit a deferred SR or deferred BSR to the network node requesting: (i) an uplink grant for a current communication, and (ii) a deferred uplink grant for a second communication. That is, the UE may determine that it has uplink data to transmit both now and in the future. Thus, in a single deferred SR or deferred BSR, the UE may request both an uplink grant now and another uplink grant after time window.

Figure 17:
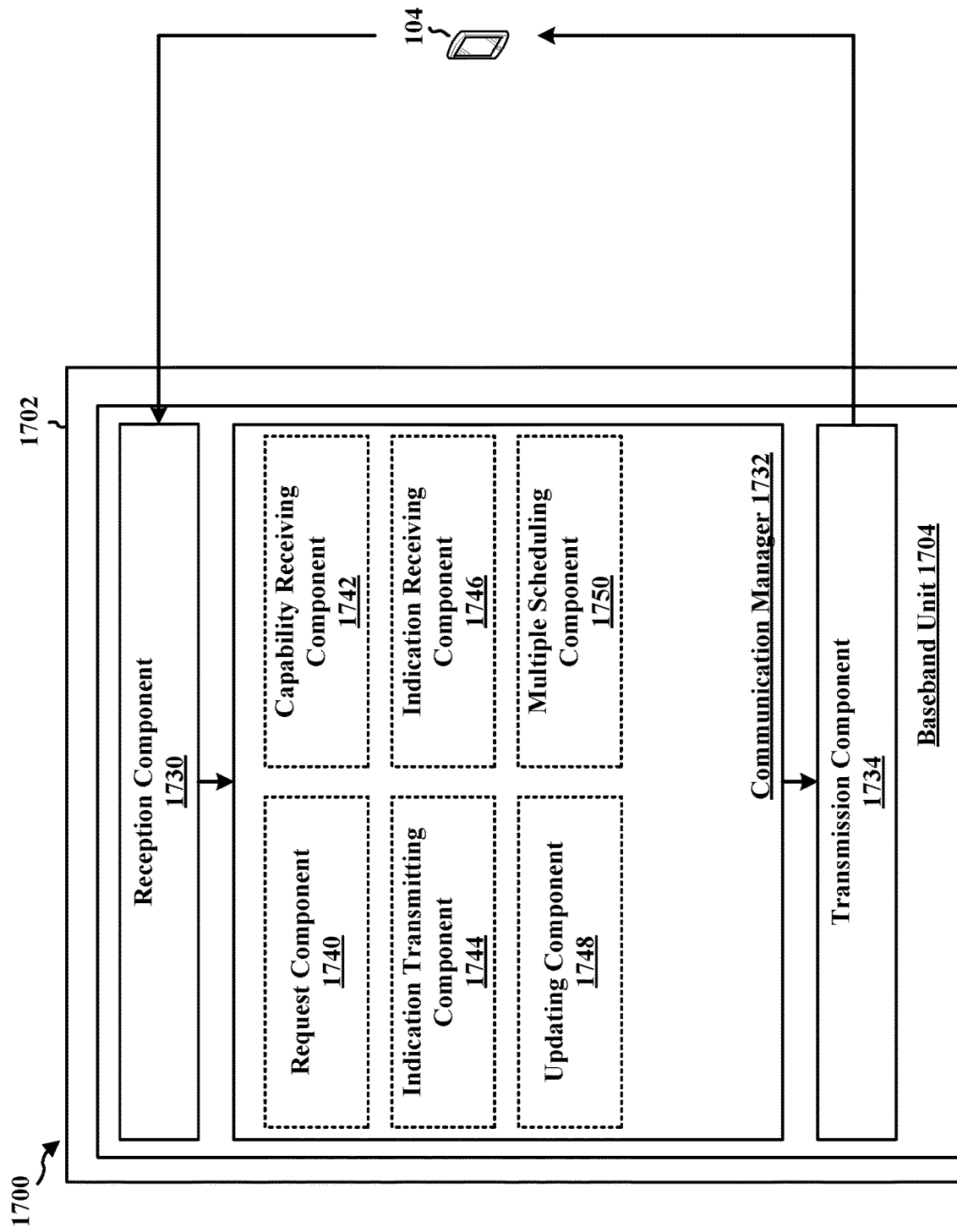
FIG. 17 is a diagram illustrating another example of a hardware implementation for another example apparatus.

FIG. 17 is a diagram 1700 illustrating an example of a hardware implementation for an apparatus 1702. The apparatus 1702 is a BS and includes a baseband unit 1704. The baseband unit 1704 may communicate through a cellular RF transceiver with the UE 104. The baseband unit 1704 may include a computer-readable medium/memory. The baseband unit 1704 is responsible for general processing, including the execution of software stored on the computer-readable medium/memory. The software, when executed by the baseband unit 1704, causes the baseband unit 1704 to perform the various functions described supra. The computer-readable medium/memory may also be used for storing data that is manipulated by the baseband unit 1704 when executing software. The baseband unit 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the baseband unit 1704. The baseband unit 1704 may be a component of the BS 102 and may include the memory 376 and/or at least one of the TX processor 316, the RX processor 370, and the controller/processor 375.

The communication manager 1732 includes a request component 1740 that is configured to output, for transmission to the UE, a request for the indication of the expected communication, e.g., as described in connection with the first step 1602 of FIG. 16.

The communication manager 1732 further includes a capability receiving component 1742 that is configured to obtain, from the UE, an indication of a capability for determining whether to expect a communication to occur after a time window, e.g., as described in connection with the second step 1604 of FIG. 16.

The communication manager 1732 further includes an indication transmitting component 1744 that is configured to output, for transmission to the UE, the indication of the duration of the time window, e.g., as described in connection with the third step 1606 of FIG. 16.

The communication manager 1732 further includes an indication receiving component 1746 that is configured to obtain, from a user equipment (UE), an indication of an expected communication, e.g., as described in connection with the fourth step 1610 of FIG. 16.

The communication manager 1732 further includes an updating component 1748 that is configured to output, for transmission to the UE, updated scheduling in response to the indication of the expected communication, e.g., as described in connection with the fifth step 1612 of FIG. 16.

The communication manager 1732 further includes a multiple scheduling component 1750 that is configured to output, for transmission during the time window, the first grant for the second communication, and output, for transmission after the time window, a second grant for the first communication; e.g., as described in connection with the sixth step 1614 and the seventh step 1616 of FIG. 16.

The apparatus may include additional components that perform each of the blocks of the algorithm in the aforementioned flowcharts of FIGs. < >. As such, each block in the aforementioned flowcharts of FIGs. < > may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1702, and in particular the baseband unit 1704, includes means for outputting, for transmission to the UE, a request for the indication of the expected communication; means for obtaining, from the UE, an indication of a capability for determining whether to expect an uplink/sidelink communication to occur after a time window; means for outputting, for transmission to the UE, the indication of the duration of the time window; means for obtaining, from a user equipment (UE), an indication of an expected communication; means for outputting, for transmission to the UE, updated scheduling in response to the indication of the expected communication; means for outputting, for transmission during the time window, the first uplink grant for the second uplink communication; and means for outputting, for transmission after the time window, a second uplink grant for the first uplink communication.

The aforementioned means may be one or more of the aforementioned components of the apparatus 1702 configured to perform the functions recited by the aforementioned means. As described supra, the apparatus 1702 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Additional Considerations

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

EXAMPLE ASPECTS

The following examples are illustrative only and may be combined with aspects of other embodiments or teachings described herein, without limitation.

Example 1 is a method for wireless communications at an apparatus, comprising: outputting, for transmission to a network node, an indication of an expected communication; and obtaining, from the network node, updated scheduling in response to the indication of the expected communication.

Example 2 is the method of example 1, wherein the expected communication comprises data to be output for transmission after a time window, and wherein at least one of: the indication of the expected communication comprises an indication of a duration of the time window, or wherein the method further comprises obtaining, from the network node, the indication of the duration of the time window.

Example 3 is the method of any of examples 1 and 2, wherein the indication of the expected communication is configured to indicate that the apparatus will output a scheduling request (SR) or a buffer status report (BSR) for transmission to the network node after a time window.

Example 4 is the method of any of examples 1-3, wherein the indication of the expected communication comprises a scheduling request (SR) configured to request a deferred grant for a communication expected to be communicated after a time window.

Example 5 is the method of example 4, wherein the indication of the expected communication further comprises an indication of at least one logic channel group (LCG) associated with the SR.

Example 6 is the method of any of examples 1-5, wherein the indication of the expected communication comprises a buffer status report (BSR) configured to indicate an expected amount of data associated with a first communication for at least a first logic channel group (LCG) of a plurality of LCGs after a time window.

Example 7 is the method of any of examples 1-6, wherein the BSR is further configured to indicate that communications are not expected for at least the first LCG during the time window.

Example 8 is the method of any of examples 1-7, wherein the BSR is further configured to indicate a current amount of data associated with a second communication for a second LCG of the plurality of LCGs, and wherein the BSR is further configured to solicit a first grant for the second communication.

Example 9 is the method of any of examples 1-8, further comprising: obtaining, during the time window, the first grant for the second communication; and obtaining, after the time window, a second grant for the first communication.

Example 10 is the method of any of examples 1-9, wherein the indication of the expected communication is configured to identify a radio bearer to be used for an communication.

Example 11 is the method of any of examples 1-10, wherein the updated scheduling comprises a scheduling update of the radio bearer or a logic channel group (LCG) associated with the radio bearer in response to the indication of the expected communication.

Example 12 is the method of any of examples 1-10, wherein the indication of the expected communication is configured to request release of a radio bearer, and wherein the updated scheduling comprises an indication of release of the radio bearer.

Example 13 is the method of any of examples 1-12, wherein the indication of the expected communication is configured to request release of an RRC connection between the apparatus and the network node, and wherein the updated scheduling comprises an indication of release of the RRC connection.

Example 14 is the method of any of examples 1-13, further comprising outputting, for transmission to the network node, an indication of a capability for determining whether to expect an communication to occur after a time window.

Example 15 is the method of any of examples 1-14, further comprising obtaining, from the network node, a request for the indication of the expected communication, and wherein the indication of the expected communication is output for transmission in response to the request.

Example 16 is the method of any of examples 1-15, wherein the indication of the expected communication is output for transmission via at least one of an uplink control information (UCI), a medium access-control (MAC) control element (MAC-CE), a backhaul adaptation protocol (BAP), or radio resource control (RRC) messaging.

Example 17 is the method of any of examples 1-16, further comprising determining whether to expect a communication to occur within a time window, wherein the determination is based on at least one of an artificial intelligence algorithm or predictability of traffic patterns by a process running on the apparatus.

Example 18 is the method of example 17, wherein the determination is based at least in part on the artificial intelligence algorithm, and wherein the indication of the expected communication comprises an indication of an accuracy of the expected communication.

Example 19 is the method of any of examples 1-18, wherein the expected communication comprises data to be output for transmission after a time window, and wherein the apparatus is preconfigured with a duration of the time window.

Example 20 is a method for wireless communications at an apparatus, comprising: obtaining, from a user equipment (UE), an indication of an expected communication; and outputting, for transmission to the UE, updated scheduling in response to the indication of the expected communication.

Example 21 is the method of example 21, wherein the expected communication comprises data to be output for transmission after a time window, and wherein at least one of: the indication of the expected communication comprises an indication of a duration of the time window, or wherein the method further comprises outputting, for transmission to the UE, the indication of the duration of the time window.

Example 22 is the method of any of examples 20 and 21, wherein the indication of the expected communication is configured to indicate that the UE will output a scheduling request (SR) or a buffer status report (BSR) for transmission to the apparatus after a time window.

Example 23 is the method of any of examples 20-22, wherein the indication of the expected communication comprises a scheduling request (SR) configured to request a deferred grant for a communication expected to be communicated after a time window.

Example 24 is the method of any of examples 20-23, wherein the indication of the expected communication further comprises an indication of at least one logic channel group (LCG) associated with the SR.

Example 25 is the method of any of examples 20-24, wherein the indication of the expected communication comprises a buffer status report (BSR) configured to indicate an expected amount of data associated with a first communication for at least a first logic channel group (LCG) of a plurality of LCGs after a time window.

Example 26 is the method of any of examples 20-25, wherein the BSR is further configured to indicate that communications are not expected for at least the first LCG during the time window.

Example 27 is the method of any of examples 20-26, wherein the BSR is further configured to indicate a current amount of data associated with a second communication for a second LCG of the plurality of LCGs, and wherein the BSR is further configured to solicit a first grant for the second communication.

Example 28 is the method of any of examples 20-27, further comprising: outputting, for transmission during the time window, the first grant for the second communication; and outputting, for transmission after the time window, a second grant for the first communication.

Example 29 is the method of any of examples 20-28, wherein the indication of the expected communication is configured to identify a radio bearer to be used for a communication.

Example 30 is the method of example 30, wherein the updated scheduling comprises a scheduling update of the radio bearer or a logic channel group (LCG) associated with the radio bearer in response to the indication of the expected communication.

Example 31 is the method of any of examples 20-30, wherein the indication of the expected communication is configured to request release of a radio bearer, and wherein the updated scheduling comprises an indication of release of the radio bearer.

Example 32 is the method of any of examples 20-31, wherein the indication of the expected communication is configured to request release of an RRC connection between the apparatus and the UE, and wherein the updated scheduling comprises an indication of release of the RRC connection.

Example 33 is the method of any of examples 20-32, further comprising obtaining, from the UE, an indication of a capability for determining whether to expect a communication to occur after a time window.

Example 34 is the method of any of examples 20-33, further comprising outputting, for transmission to the UE, a request for the indication of the expected communication.

Example 35 is the method of any of examples 20-34, wherein the indication of the expected communication is obtained via at least one of an uplink control information (UCI), a medium access-control (MAC) control element (MAC-CE), a backhaul adaptation protocol (BAP), or radio resource control (RRC) messaging.

Example 36 is the method of any of examples 20-35, wherein the expected communication comprises data to be obtained after a time window, and wherein the apparatus is preconfigured with a duration of the time window.

Example 37 is a UE, comprising: a transceiver; a memory comprising instructions; and one or more processors configured to execute the instructions to cause the UE to perform a method in accordance with any one of examples 1-19, wherein the transceiver is configured to: transmit, to a network node, an indication of an expected communication; and receive, from the network node, updated scheduling in response to the indication of the expected communication.

Example 38 is a network node, comprising: a transceiver; a memory comprising instructions; and one or more processors configured to execute the instructions and cause the network node to perform a method in accordance with any one of examples 20-36, wherein the transceiver is configured to: receive, from a user equipment (UE), an indication of an expected communication; and transmit, to the UE, updated scheduling in response to the indication of the expected communication.

Example 39 is an apparatus for wireless communications, comprising means for performing a method in accordance with any one of examples 1-19.

Example 40 is an apparatus for wireless communications, comprising means for performing a method in accordance with any one of examples 20-36.

Example 41 is a non-transitory computer-readable medium comprising instructions that, when executed by an apparatus, cause the apparatus to perform a method in accordance with any one of examples 1-19.

Example 42 is a non-transitory computer-readable medium comprising instructions that, when executed by an apparatus, cause the apparatus to perform a method in accordance with any one of examples 20-36.

Example 44 is an apparatus for wireless communications, comprising: a memory comprising instructions; and one or more processors configured to execute the instructions to cause the apparatus to perform a method in accordance with any one of examples 1-19.

Example 45 is apparatus for wireless communications, comprising: a memory comprising instructions; and one or more processors configured to execute the instructions to cause the apparatus to perform a method in accordance with any one of examples 20-36.

What is claimed is:

1. An apparatus for wireless communications, comprising:
 a memory comprising instructions; and
 one or more processors configured to execute the instructions and cause the apparatus to:
  output, for transmission to a network node, a scheduling request (SR) comprising an indication of an expected communication configured to request a grant for a communication expected to be communicated after a time window; and
  obtain, from the network node, the grant in response to the indication of the expected communication.

2. The apparatus of claim 1, wherein the expected communication comprises data to be output for transmission after the time window, and wherein at least one of:
 the indication of the expected communication comprises an indication of a duration of the time window, or
 the apparatus is further configured to obtain, from the network node, the indication of the duration of the time window.

3. The apparatus of claim 1, wherein the indication of the expected communication is configured to indicate that the apparatus will output another SR or a buffer status report (BSR) for transmission to the network node after the time window.

4. The apparatus of claim 1, wherein the indication of the expected communication further comprises an indication of at least one logic channel group (LCG) associated with the SR.

5. The apparatus of claim 1, wherein the indication of the expected communication comprises a buffer status report (BSR) configured to indicate an expected amount of data associated with a first communication for at least a first logic channel group (LCG) of a plurality of LCGs after the time window.

6. The apparatus of claim 5, wherein the BSR is further configured to indicate that communications are not expected for at least the first LCG during the time window.

7. The apparatus of claim 5, wherein the BSR is further configured to indicate a current amount of data associated with a second communication for a second LCG of the plurality of LCGs, and wherein the BSR is further configured to solicit a first grant for the second communication.

8. The apparatus of claim 7, wherein the apparatus is further configured to:
 obtain, during the time window, the first grant for the second communication; and
 obtain, after the time window, a second grant for the first communication.

9. The apparatus of claim 1, wherein the indication of the expected communication is configured to identify a radio bearer to be used for a communication.

10. The apparatus of claim 9, wherein the grant comprises a scheduling update of the radio bearer or a logic channel group (LCG) associated with the radio bearer in response to the indication of the expected communication.

11. The apparatus of claim 9, wherein the indication of the expected communication is configured to request release of a radio bearer, and wherein the grant comprises an indication of release of the radio bearer.

12. The apparatus of claim 1, wherein the indication of the expected communication is configured to request release of an RRC connection between the apparatus and the network node, and wherein the grant comprises an indication of release of the RRC connection.

13. The apparatus of claim 1, wherein the apparatus is further configured to output, for transmission to the network node, an indication of a capability for determining whether to expect a communication to occur after the time window.

14. The apparatus of claim 1, wherein the apparatus is further configured to obtain, from the network node, a request for the indication of the expected communication, and wherein the indication of the expected communication is outputted for transmission in response to the request.

15. The apparatus of claim 1, wherein the indication of the expected communication is outputted for transmission via an uplink control information (UCI).

16. The apparatus of claim 1, wherein the apparatus is further configured to determine whether to expect a communication to occur within the time window, wherein the determination is based on at least one of an artificial intelligence algorithm or predictability of traffic patterns by a process running on the apparatus.

17. The apparatus of claim 16, wherein the determination is based at least in part on the artificial intelligence algorithm, and wherein the indication of the expected communication comprises an indication of an accuracy of the expected communication.

18. The apparatus of claim 1, wherein the expected communication comprises data to be outputted for transmission after the time window, and wherein the apparatus is configured with a duration of the time window.

19. The apparatus of claim 1, further comprising a transceiver configured to:
    transmit, to the network node, the SR comprising the indication of the expected communication; and
    receive, from the network node, the grant, wherein the apparatus is configured as a user equipment (UE).

20. An apparatus for wireless communications, comprising:
    a memory comprising instructions; and
    one or more processors configured to execute the instructions and cause the apparatus to:
        obtain, from a user equipment (UE), a scheduling request (SR) comprising an indication of an expected communication configured to request a grant for a communication expected to be communicated after a time window; and
        output, for transmission to the UE, the grant in response to the indication of the expected communication.

21. The apparatus of claim 20, wherein the expected communication comprises data to be output for transmission after the time window, and wherein at least one of:
    the indication of the expected communication comprises an indication of a duration of the time window, or
    the apparatus is further configured to output, for transmission to the UE, the indication of the duration of the time window.

22. The apparatus of claim 20, wherein the indication of the expected communication is configured to indicate that the UE will output another SR or a buffer status report (BSR) for transmission to the apparatus after the time window.

23. The apparatus of claim 20, wherein the indication of the expected communication further comprises an indication of at least one logic channel group (LCG) associated with the SR.

24. The apparatus of claim 20, wherein the indication of the expected communication comprises a buffer status report (BSR) configured to indicate an expected amount of data associated with a first communication for at least a first logic channel group (LCG) of a plurality of LCGs after the time window.

25. The apparatus of claim 24, wherein the BSR is further configured to indicate that communications are not expected for at least the first LCG during the time window.

26. The apparatus of claim 20, further comprising a transceiver configured to:
    receive, from the UE, the SR comprising the indication of the expected communication; and
    transmit, to the UE, the grant in response to the indication of the expected communication, wherein the apparatus is configured as a network node.

27. A method for wireless communications at an apparatus, comprising:
    outputting, for transmission to a network node, a scheduling request (SR) comprising an indication of an expected communication configured to request a grant for a communication expected to be communicated after a time window; and
    obtaining, from the network node, the grant in response to the indication of the expected communication.

28. The method of claim 27, wherein the expected communication comprises data to be output for transmission after the time window, and wherein at least one of:
    the indication of the expected communication comprises an indication of a duration of the time window, or
    the method further comprises obtaining, from the network node, the indication of the duration of the time window.

* * * * *